(12) United States Patent
Katka

(10) Patent No.: US 7,116,327 B2
(45) Date of Patent: Oct. 3, 2006

(54) METHODS FOR GENERATING CONTROL POINTS FOR CUBIC BEZIER CURVES

(75) Inventor: Robert Matthew Katka, Pewaukee, WI (US)

(73) Assignee: Agfa Corporation, Ridgefield Park, NJ (US)

( * ) Notice: Subject to any disclaimer, the term of this patent is extended or adjusted under 35 U.S.C. 154(b) by 268 days.

(21) Appl. No.: 10/930,133

(22) Filed: Aug. 31, 2004

(65) Prior Publication Data

US 2006/0044305 A1    Mar. 2, 2006

(51) Int. Cl.
*G06T 11/20* (2006.01)

(52) U.S. Cl. .................................... 345/442

(58) Field of Classification Search ............... 345/442, 345/443, 186
See application file for complete search history.

(56) References Cited

U.S. PATENT DOCUMENTS

| | | | |
|---|---|---|---|
| 5,666,472 A | 9/1997 | Huddy | |
| 6,058,200 A | 5/2000 | Blaseio | |
| 6,295,072 B1 * | 9/2001 | Pon et al. | 345/442 |
| 6,441,823 B1 | 8/2002 | Ananya | |
| 6,512,847 B1 | 1/2003 | Gnutzmann | |
| 6,549,205 B1 | 4/2003 | Horii et al. | |
| 6,693,646 B1 | 2/2004 | Jones | |
| 2004/0125116 A1 | 7/2004 | Lee et al. | |

* cited by examiner

*Primary Examiner*—Mark Zimmerman
*Assistant Examiner*—David Chu
(74) *Attorney, Agent, or Firm*—Michael Best & Friedrich, LLP

(57) ABSTRACT

Methods and devices for generating a cubic Bézier curve between a first point and a second point from a sequence of ordered points. One embodiment provides a method that includes selecting a third point from the sequence of ordered points; determining a first control point based on the first point, the second point, and the third point; selecting a fourth point from the sequence of ordered points; determining a second control point based on the first point, the second point, and the fourth point; and generating a cubic Bézier curve between the first point and the second point using the first control point and the second control point.

73 Claims, 22 Drawing Sheets

METHODS FOR GENERATING CONTROL POINTS FOR CUBIC BEZIER CURVES

BACKGROUND OF THE INVENTION

Modern operating systems use cubic Bézier curves extensively to represent many user interface components. For example, the individual glyphs of a font are typically represented as a sequence of cubic Bézier curves. Operating system must therefore contain functionality for generating cubic Bézier curves in order to display textual interfaces and graphical interfaces.

Generally, a cubic Bézier curve is defined by a start point $(x_0, y_0)$, an end point $(x_3, y_3)$, and two control points $(x_1, y_1)$ and $(x_2, y_2)$. The two control points determine the shape of the curve. Two cubic equations define the points on the curve. Both equations are evaluated for an arbitrary number of values of t between 0 and 1. One equation provides values for x, and the other provides values for y. As values for t are supplied to the equations, the points (x(t), y(t)) define the line between the start point and the end point. Exemplary cubic Bézier curve equations are illustrated below.

$$x(t) = a_x t^3 + b_x t^2 + c_x t + x_0$$

$$y(t) = a_y t^3 + b_y t^2 + c_y t + y_0$$

The values of the coefficients $a_x$, $b_x$, $c_x$, $a_y$, $b_y$, and $c_y$ can be determined using the four known points.

SUMMARY OF THE INVENTION

Most existing methods and systems for generating a sequence of cubic Bézier curves use advanced math functions, such as derivatives, integrals, and statistical analysis, to determine precise control points. Some of the advanced math functions used may not be supported within an operating system's application programming interface ("API"). Thus in some instances, it is necessary to add advanced math functions to an operating system's API specifically for the purpose of generating cubic Bézier curves. However, using advanced math functions is generally not ideal. Usually, advance math functions require the use of third-party software, or a significant investment in terms of programming time and effort. Furthermore, advanced math functions typically do not perform as well as the simpler math functionality prepackaged within an operating system's API.

Thus it would be useful to be able to generate control points for a cubic Bézier or smooth curve without the use of advanced math functions.

Some embodiments of the invention provide a method of generating a control point for a cubic Bézier curve between a first point and a second point in a sequence of ordered points using three consecutive points from the sequence of ordered points. The three consecutive points include the first point, the second point, and a third point. The generated control point is based on coordinates of the first, second, and third points.

Additional embodiments provide a method of generating a control point for a cubic Bézier curve between a first point and a second point in a sequence of ordered points. The method includes selecting a third point from the sequence of ordered points and determining a first line segment between the first point and the second point and a second line segment between the second point and the third point. The method further includes determining a first horizontal reference line containing the first point and a second horizontal reference line containing the second point. The method also includes determining a first angle between the first horizontal reference line and the first line segment and a second angle between the second horizontal reference line and the first line segment, and a third angle between the second horizontal reference line and the second line segment. Then generating a fourth angle based on the first angle and the average of the second and third angles, generating a control distance based on the first line segment, and generating the control point based on the fourth angle and the control distance.

Another embodiment provides a method of generating a first control point for a cubic Bézier curve between a first point and a second point in a sequence of ordered points. The method includes selecting a third point from the sequence of ordered points and determining a first line segment between the first point and the second point and a second line segment between the second point and the third point. The method further includes determining a first horizontal reference line containing the first point and determining a first angle between the first horizontal reference line and the first line segment. The method includes determining a second horizontal reference line containing the second point and determining a second angle between the second horizontal reference line and the first line segment, and determining a third angle between the second horizontal reference line and the second line segment. The method also includes generating a fourth angle based on the first angle and the average of the second and third angles, generating a first control distance based on the first line segment, and generating the first control point based on the fourth angle and the control distance.

Yet another embodiment provides a method of generating a cubic Bézier curve between a first point and a second point from a sequence of ordered points. The method includes selecting a third point from the sequence of ordered points; determining a first control point based on the first point, the second point, and the third point; determining a second control point based on the first point, the second point, and the third point; and generating a cubic Bézier curve between the first point and the second point using the first control point and the second control point.

Additional embodiments provide a method of generating a cubic Bézier curve for a sequence of ordered points. The method includes selecting a first set of three consecutive points from the sequence of points. The first set contains a first point, a second point, and a third point. The method further includes determining a first line segment between the first point and the second point; determining a second line segment between the second point and the third point; determining a first horizontal reference line containing the second point; determining a first angle between the first horizontal reference line and the first line segment; determining a second angle between the first horizontal reference line and the second line segment; generating a third angle from the first angle and the second angle; generating a first control distance from the first line segment and the second line segment; and generating a first control point based on the third angle and the first control distance. To generate a second control point, the method includes selecting a second set of three consecutive points from the sequence of points. The second set contains the second point, the third point, and a fourth point. The method further includes determining a third line segment between the third point and the fourth point; determining a second horizontal reference line containing the third point; determining a fourth angle between the second horizontal reference line and the second line segment; determining a fifth angle between the second horizontal reference line and the third line segment; generating a sixth angle from the fourth angle and the fifth angle; generating a second control distance from the second line segment and the third line segment; generating a second control point based on the sixth angle and the second control distance; and generating a cubic Bézier curve between the second point and the third point using the first control point and the second control point.

Another embodiment provides computer-readable medium containing instructions for selecting a first set of three consecutive points from an ordered sequence of points, the first set including a first point, a middle point, and a third point. The computer-readable medium further includes instructions for determining a first control point based on the first set; selecting a second set of three consecutive points from an ordered sequence of points, the second set including at least two points of the first set and a fourth point; and determining a second control point based on the second set.

Yet another embodiment provides an operating system configured to select a first set of three consecutive points from an ordered sequence of points. The first set includes a first point, a middle point, and a third point. The operating system is further configured to determine a first control point based on the first set and to select a second set of three consecutive points from an ordered sequence of points. The second set includes at least two points of the first set and a fourth point, and the operating system is configured to determine a second control point based on the second set.

Other features and aspects of embodiments of the invention will become apparent to those skilled in the art upon review of the following detailed description, claims, and drawings.

Figure 1:
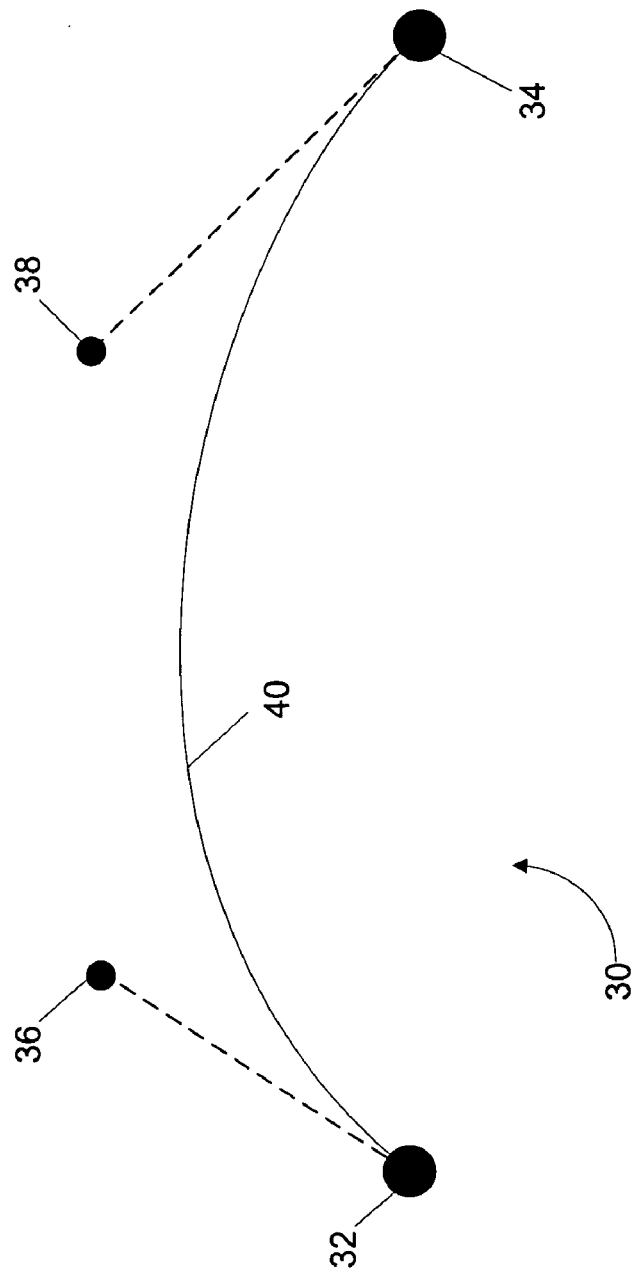
FIG. 1 illustrates an exemplary cubic Bézier curve.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Before embodiments of the invention are described in detail a brief review of the cubic Bézier curves is provided. Nonetheless, it is assumed that the reader is familiar with cubic Bézier curve construction.

As noted above, cubic Bézier curves are defined by two equations and connect a starting point and an ending point under the direction of two control points. A point, as used within this application, refers to a geometric element that has a position but no extension. Coordinates may define a point, and when speaking of creating cubic Bézier curves for display on a monitor or screen, a pixel may represent a point.

Figure 2:
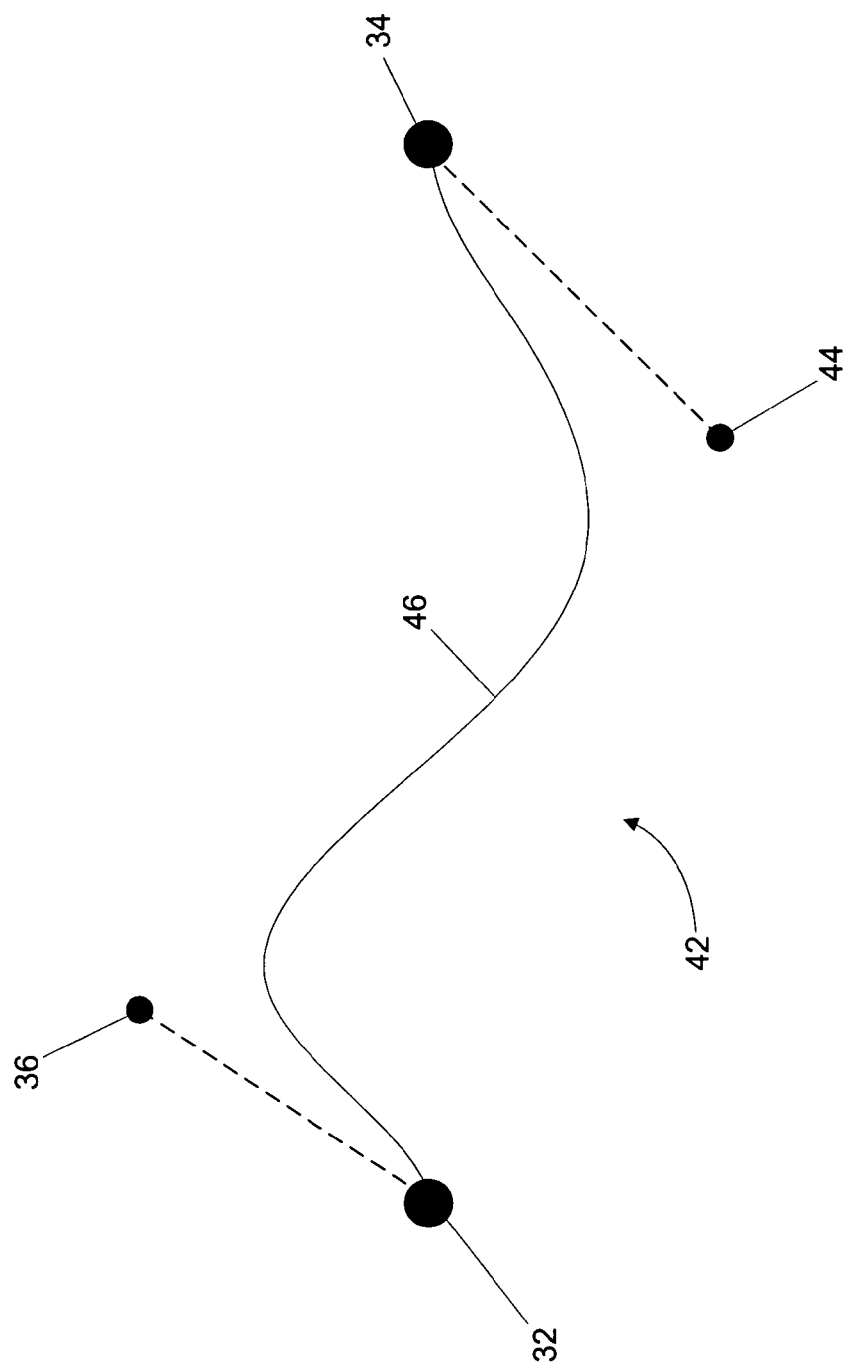
FIG. 2 illustrates another exemplary cubic Bézier curve.

FIG. 1 illustrates an exemplary cubic Bézier curve 30. The cubic Bézier curve 30 has a start point 32, an end point 34, and two control points 36 and 38. The connecting curve or spline 40 connects the start point 32 and the end point 34. The coordinates of the control points 36 and 38 influence the direction and shape of the spline 40. The control points 36 and 38 can be thought of as magnets that attract the spline 40. The shape of the spline 40 is influenced by the attraction of control points. As with magnets, the location of the control points influence the amount of attraction generated on the spline 40. FIG. 2, for example, illustrates another exemplary cubic Bézier curve 42. The cubic Bézier curve 42 illustrated in FIG. 2 has the same start point 32, end point 34, and control point 36 as the cubic Bézier curve 30 illustrated in FIG. 1. The cubic Bézier curve 42, however, has a control point 44 that is different (has different coordinates) than the control point 38 of the cubic Bézier curve 30 illustrated in FIG. 1. As illustrated in FIG. 2, the change of a single control point creates a different shaped spline 46 connecting the same start point 32 and end point 34.

Figure 3:
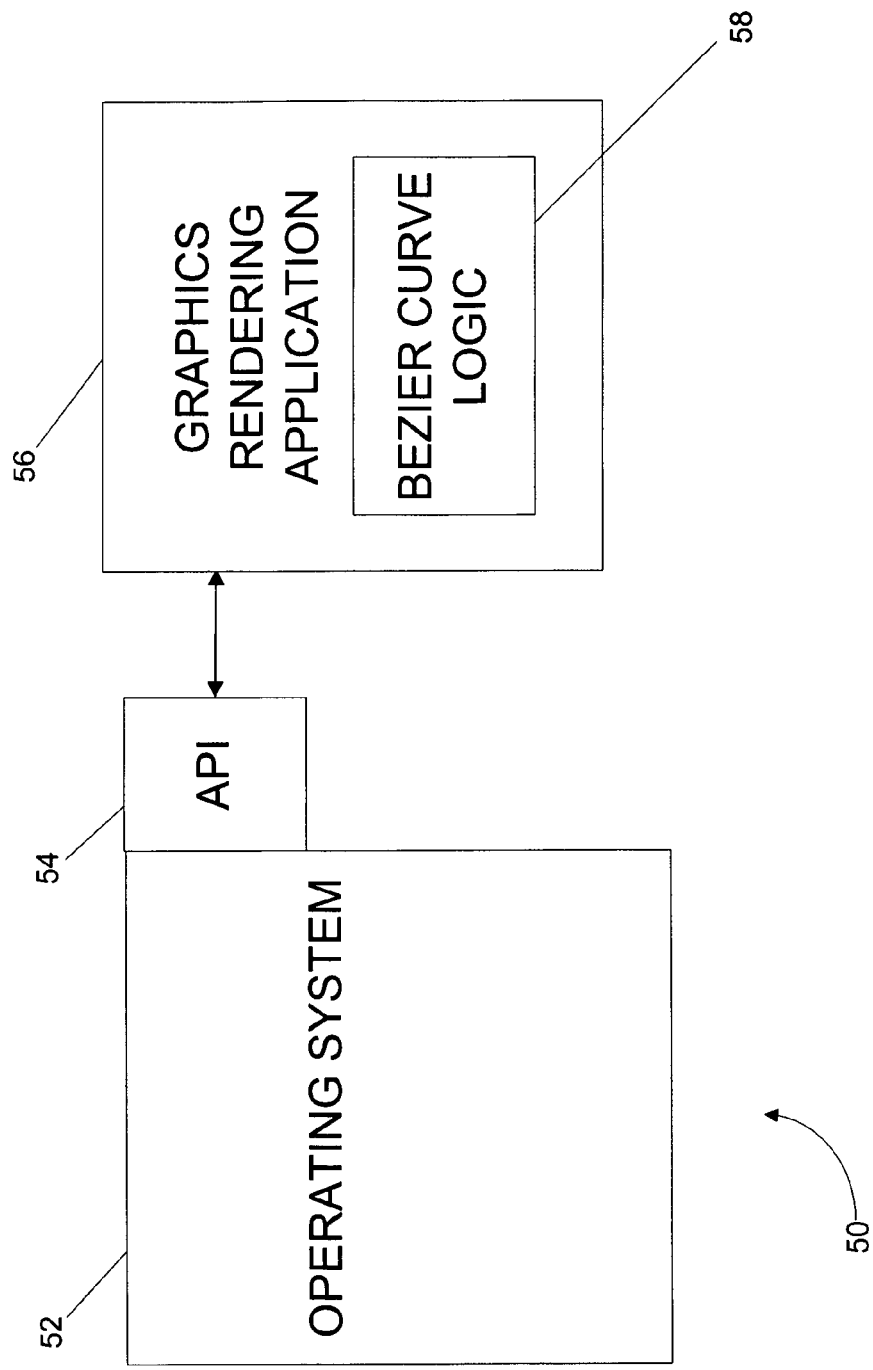
FIG. 3 is a schematic illustration of an exemplary system for generating a cubic Bézier curve.

FIG. 3 illustrates an exemplary system 50 for generating a cubic Bézier curve. The system 50 includes an operating system 52, an application programming interface ("API") 54, a graphics rendering application 56, and cubic Bézier curve logic 58. In some embodiments, the cubic Bézier curve logic 58 generates control points for cubic Bézier curves. The graphics rendering application 56 may generate the start point, end point, and, using the cubic Bézier curve logic 58, one or more control points for a cubic Bézier curve. The graphics rendering application 56 may use the API 54 of the operating system 52 to pass the points to the operating system 52 and invoke the operating system 52 to instruct a display device such as a computer monitor to display a cubic Bézier curve based on the provided point parameters. For example, a graphical device interface ("GDI") of the Windows® operating system manufactured by the Microsoft® Corporation provides method calls such as GraphicsPath::AddBézier(point1, point2, point3, point4) and Graphics::DrawBézier(pen, point1, point2, point3, point4). The parameters of these operating system calls contain the points necessary to generate a cubic Bézier curve, including the control points. The operating system 52 uses the passed parameters to generate the requested cubic Bézier curves using cubic Bézier curve equations, such as those presented earlier. Furthermore, the operating system 52 may instruct a display device, such as a computer monitor, to graphically display the generated cubic Bézier curves. As should be apparent, the graphics rendering application 56 and the Bézier curve logic 58 can be stored on various computer readable media.

Figure 4:
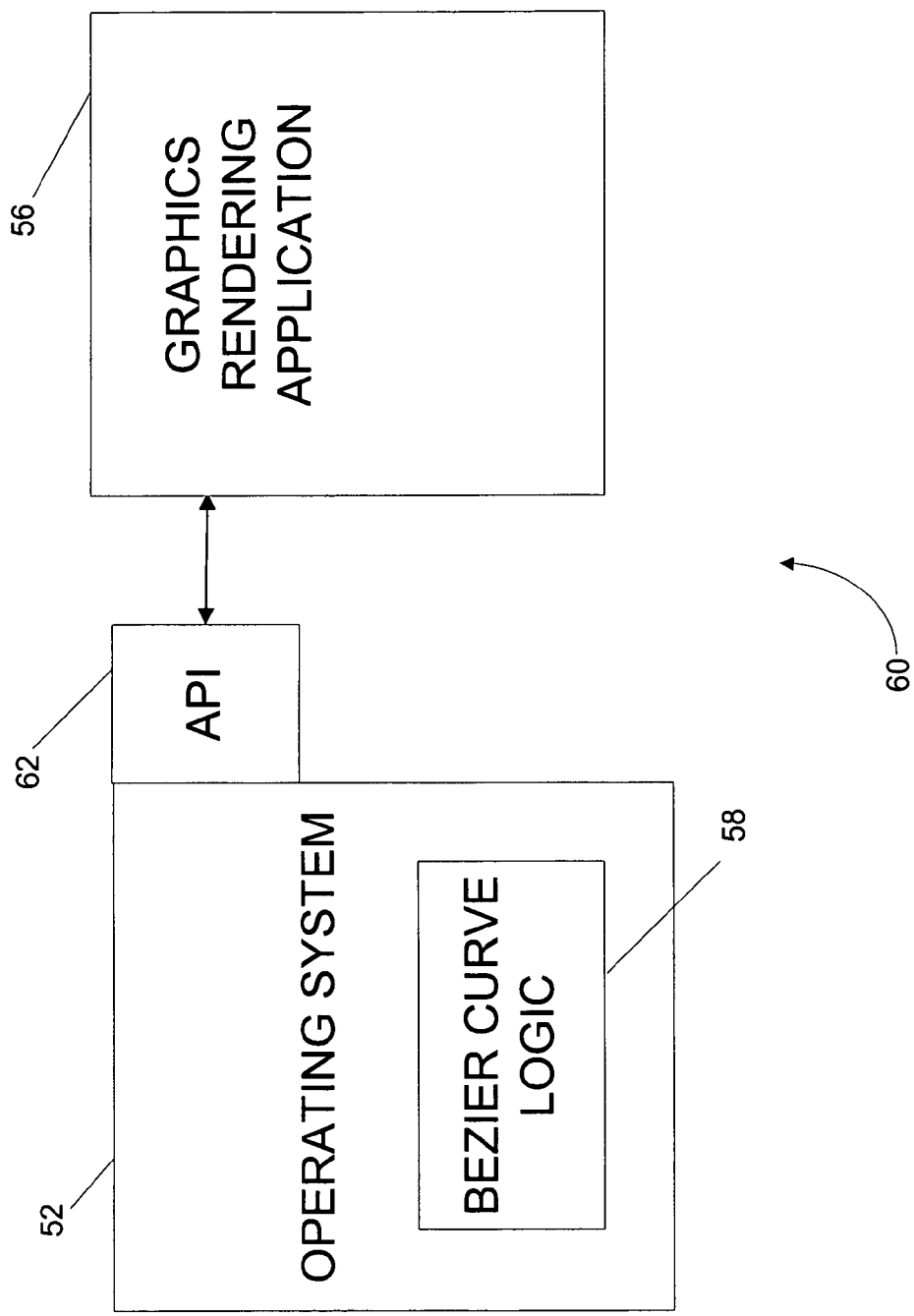
FIG. 4 is another schematic illustration of an exemplary system for generating a cubic Bézier curve.

In another embodiment, as illustrated in FIG. 4, a system 60 is used to generate cubic Bézier curves. The system 60 includes the operating system 52, an API 62, the graphics rendering application 56, and the cubic Bézier curve logic 58. In contrast to the system 50 illustrated in FIG. 3, the cubic Bézier curve logic 58 is contained within the operating system 52. Using the system 60, the operating system 52 may provide control point generation internally, using the cubic Bézier curve logic 58. The graphics rendering application 56 may pass parameters through the API 62 and provide the operating system 52 with the start point and end point for a cubic Bézier curve. The operating system 52 may use the cubic Bézier curve logic 58 to generate the needed control points, and may further instruct a display device to display a cubic Bézier curve based on the start point and end point provided by the graphics rendering application 56 and the one or more generated control points.

Figure 5:
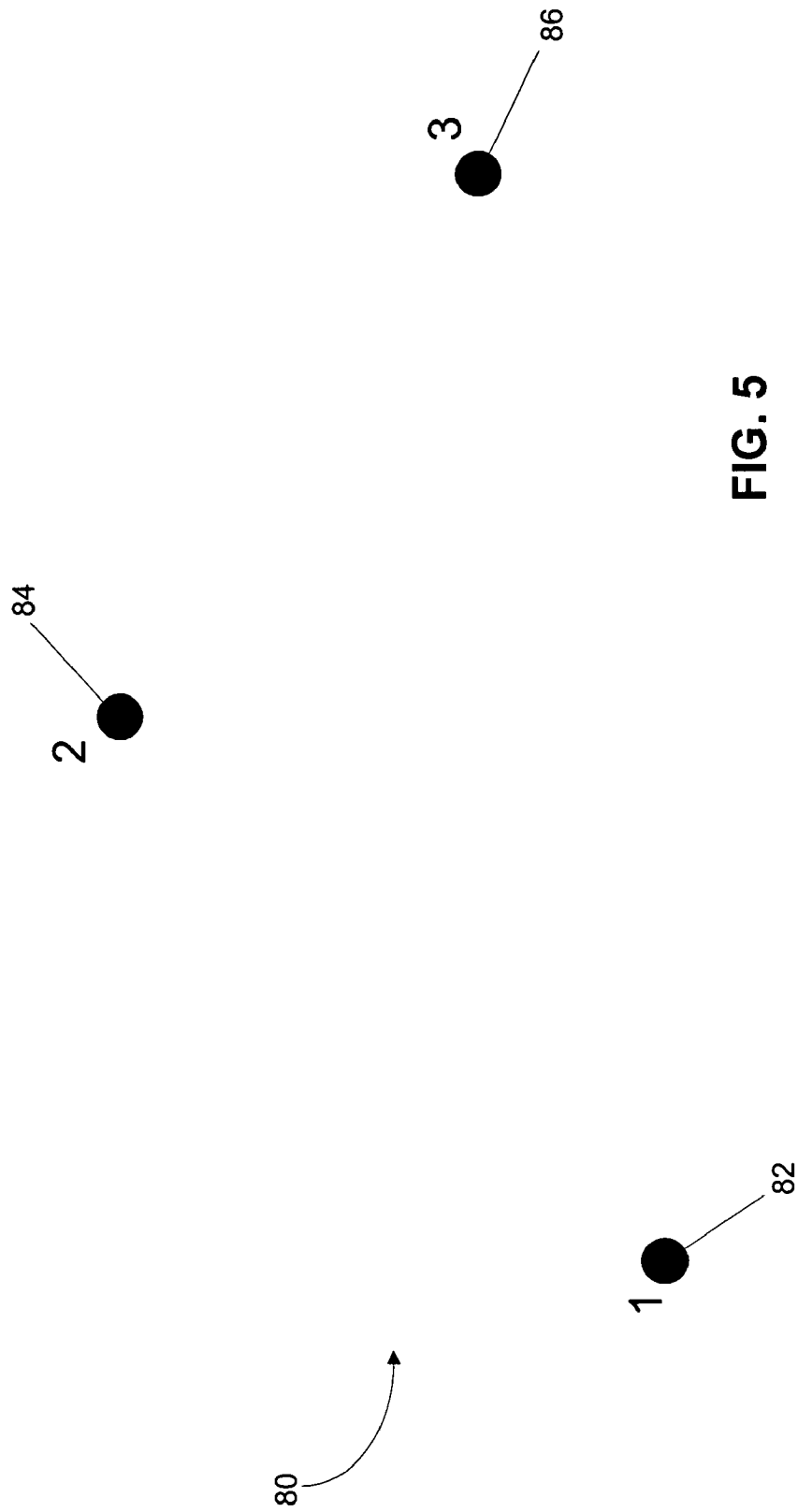
FIG. 5 illustrates an exemplary set of points.

FIG. 5 illustrates an exemplary set of points 80. The set 80 includes a first end point 82, a second non-end point 84, and a third end point 86. The points 82, 84, and 86 of the set 80 may be ordered, and the order may indicate a sequence for connecting the points. The first end point 82 and the third end point 86 may be termed end points since they at the beginning and end of the set of points 80. The graphics rendering application 56 or operating system 52 may be configured to generate a series of cubic Bézier curves creating a smooth curve that connects the points 82, 84, and 86 of the set 80. The term connecting, as used in the current application, includes generating and displaying a graphical curve that starts at one point (coordinate) and moves or leads to another point (coordinate). The series of cubic Bézier curves may consist of a number of curves equal to one less than the total number of points in the set of points 80. Creating this many curves provides a cubic Bézier curve between every pair of consecutive points starting from the first point of a set of points and ending with the last point of a set of points. The size and ordering of the set 80, for example, may imply that a graphics rendering application should generate two (size of set −1) cubic Bézier curves; one cubic Bézier curve connecting the first end point 82 and the second non-end point 84 and another cubic Bézier curve connecting the second non-end point 84 and the third end point 86. In general, the series of cubic Bézier curves may provide a curve between every pair of points ($P_n$, $P_{n+1}$), where n goes from 0 (where the first point of the set of points is point $P_0$) to two less than the total number of points in the set of points.

When generating a cubic Bézier curve between consecutive points in a set of points, each non-end point (i.e., every point beside the first and last point of the set) may have two control points associated with it. Each non-end point may have one control point for a cubic Bézier curve connecting itself to a point sequentially before itself in the set of points and one control point for a cubic Bézier curve connecting itself to a point sequentially after itself in the set of points. In contrast, each end point may have only a single control point associated with it since each end point is only included in a single cubic Bézier curve connecting itself to either a point sequentially before or after itself in the set of points. Consequently, two different methods for generating control points may be used by the cubic Bézier curve logic 58. One method may generate two control points for a non-end point, and another method may generate a single control point for an end point. Exemplary techniques for both methods are illustrated in FIGS. 6–21 and will be described in detail below.

Figure 6:
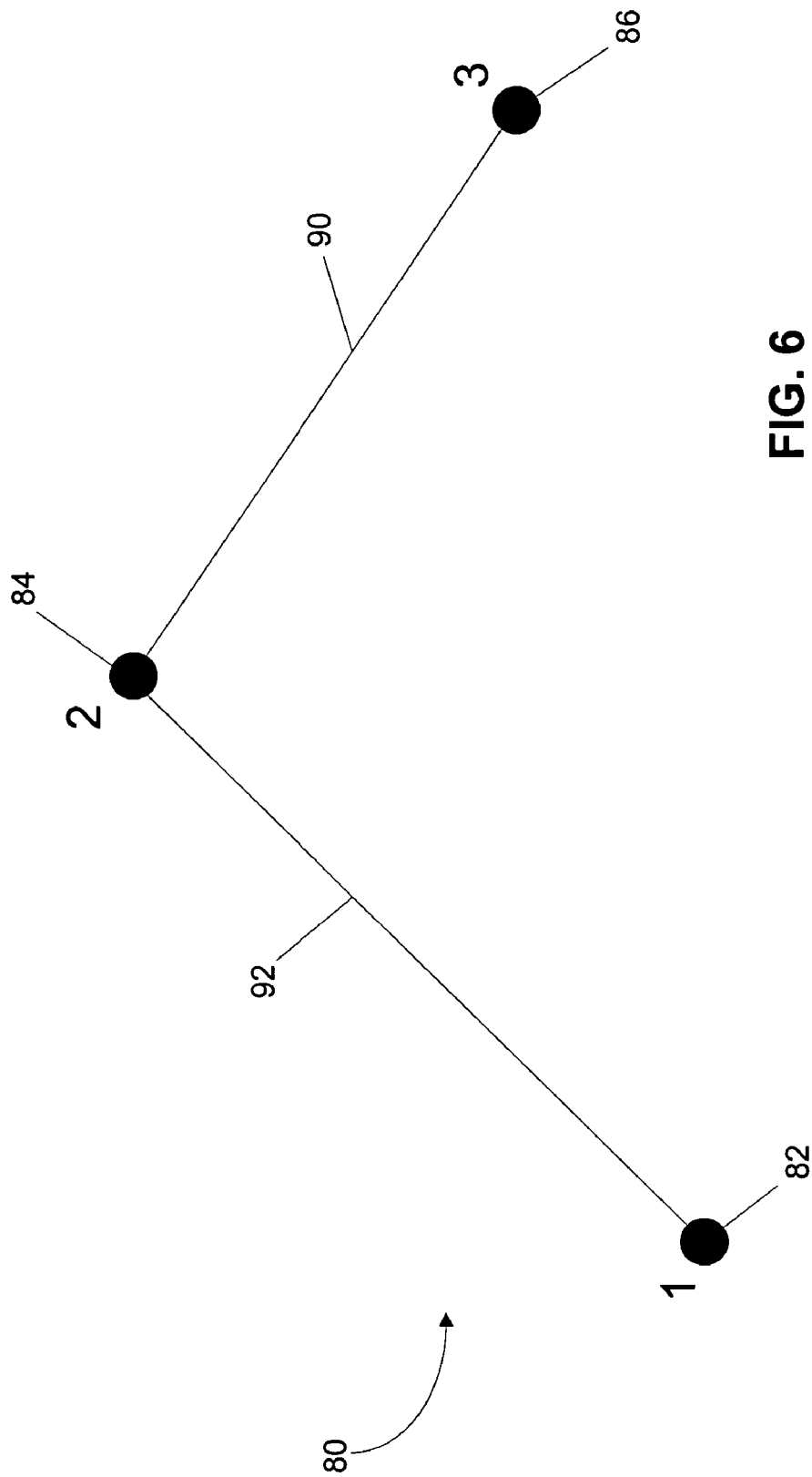
FIGS. 6–21 illustrate exemplary steps of methods for determining control points for cubic Bézier curves associated with the set of points of FIG. 5.
Figure 7:
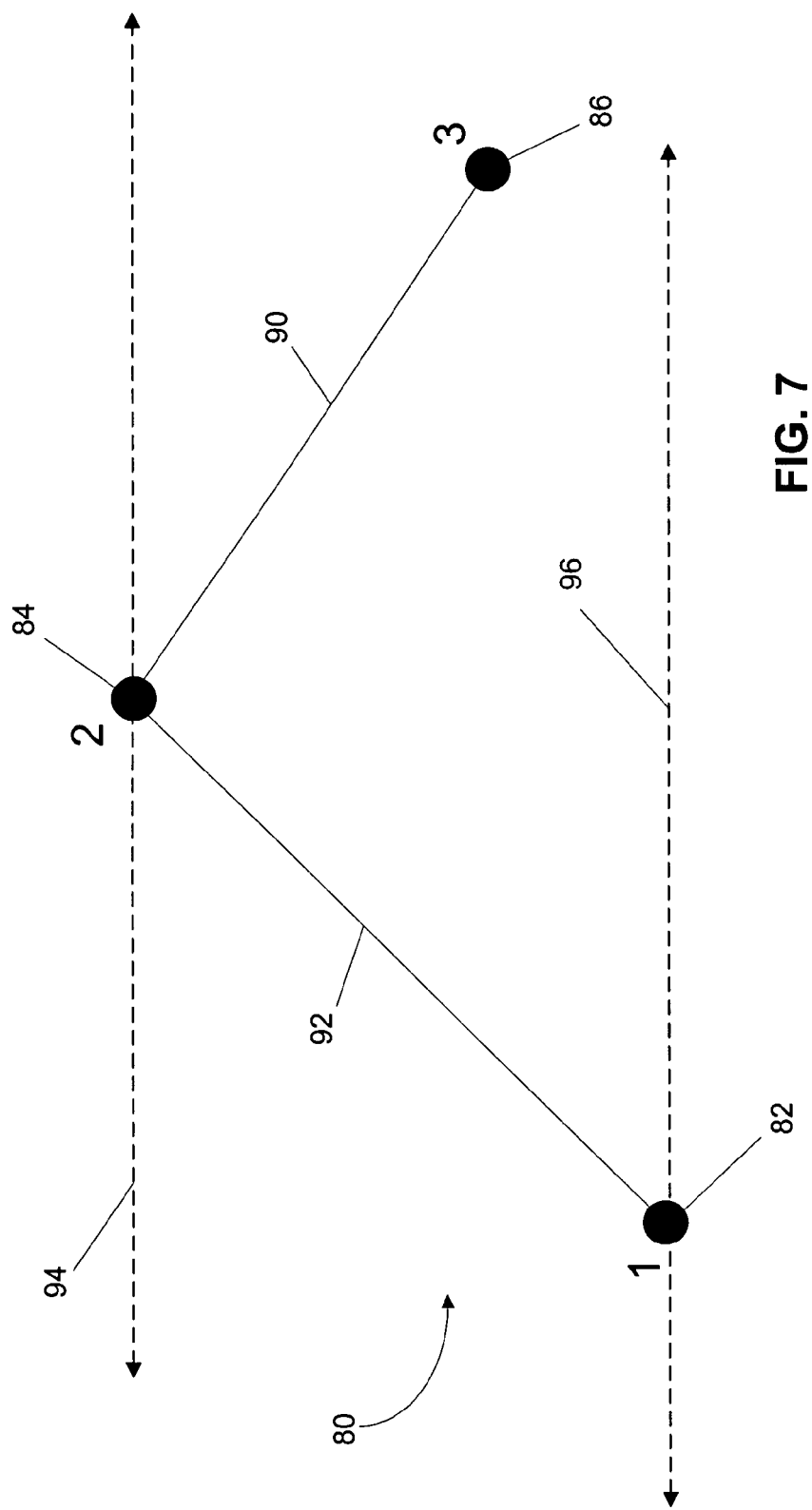

To determine a control point associated with an end point, the cubic Bézier curve logic 58 begins by determining a straight line segment between the end point ($P_x$) and the next consecutive point ($P_{x+1}$ or $P_{x-1}$) and a straight line segment between the next consecutive point ($P_{x+1}$ or $P_{x-1}$) and the next consecutive point therefrom ($P_{x+2}$ or $P_{x-2}$). For the exemplary set of points 80, as illustrated in FIG. 6, the cubic Bézier curve logic 58 determines a first line segment 90 between the second non-end point 84 and the third end point 86 and a second line segment 92 between the second non-end point 84 and the first end point 82. The cubic Bézier curve logic 58 also determines a first horizontal reference line containing the next consecutive point from the end point ($P_{x+1}$ or $P_{x-1}$) and a second horizontal reference line containing the end point ($P_x$). An exemplary first horizontal line 94 containing the second non-end point 84 and a second horizontal line 96 containing the first end point 82 is illustrated in FIG. 7.

Figure 8:
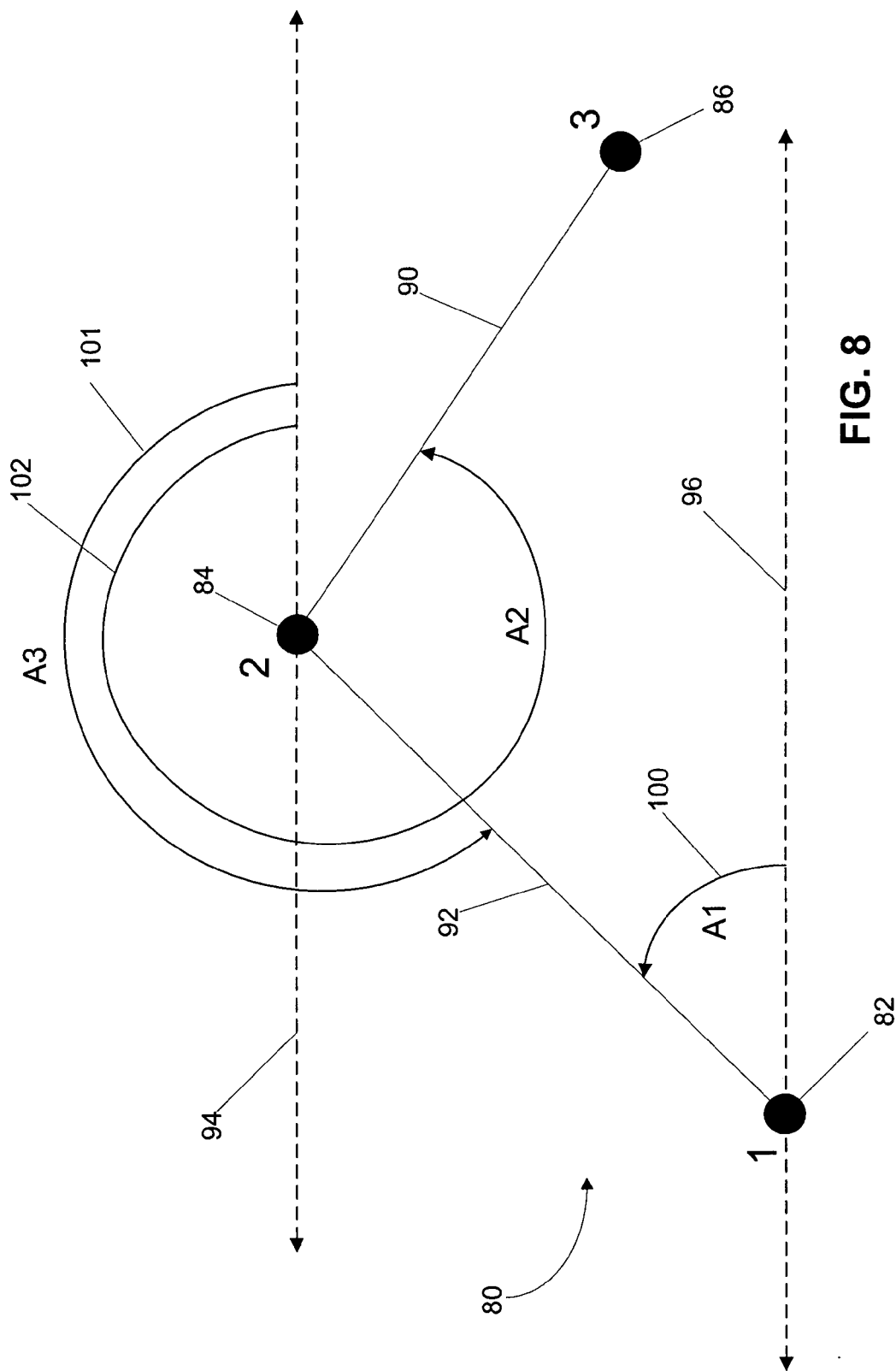

After generating the horizontal reference lines, the cubic Bézier curve logic 58 determines a first displacement angle between the second line segment and the second horizontal reference line, which contains the end point ($P_x$). The cubic Bézier curve logic 58 also determines a second displacement angle between the first line segment and the first horizontal reference line containing the next consecutive point to the end point ($P_{x+1}$ or $P_{x-1}$) The cubic Bézier curve logic 58 also determines a third displacement angle between the second line segment and the first horizontal reference line containing the next consecutive point to the end point ($P_{x+1}$ or $P_{x-1}$). FIG. 8 illustrates a first displacement angle 100 between the second horizontal reference line 96 and the second line segment 92 and a second displacement angle 102 between the first horizontal reference line 94 and the first line segment 90. The figure also illustrates a third displacement angle 101 between the first horizontal reference line 94 and the second line segment 92.

Figure 9:
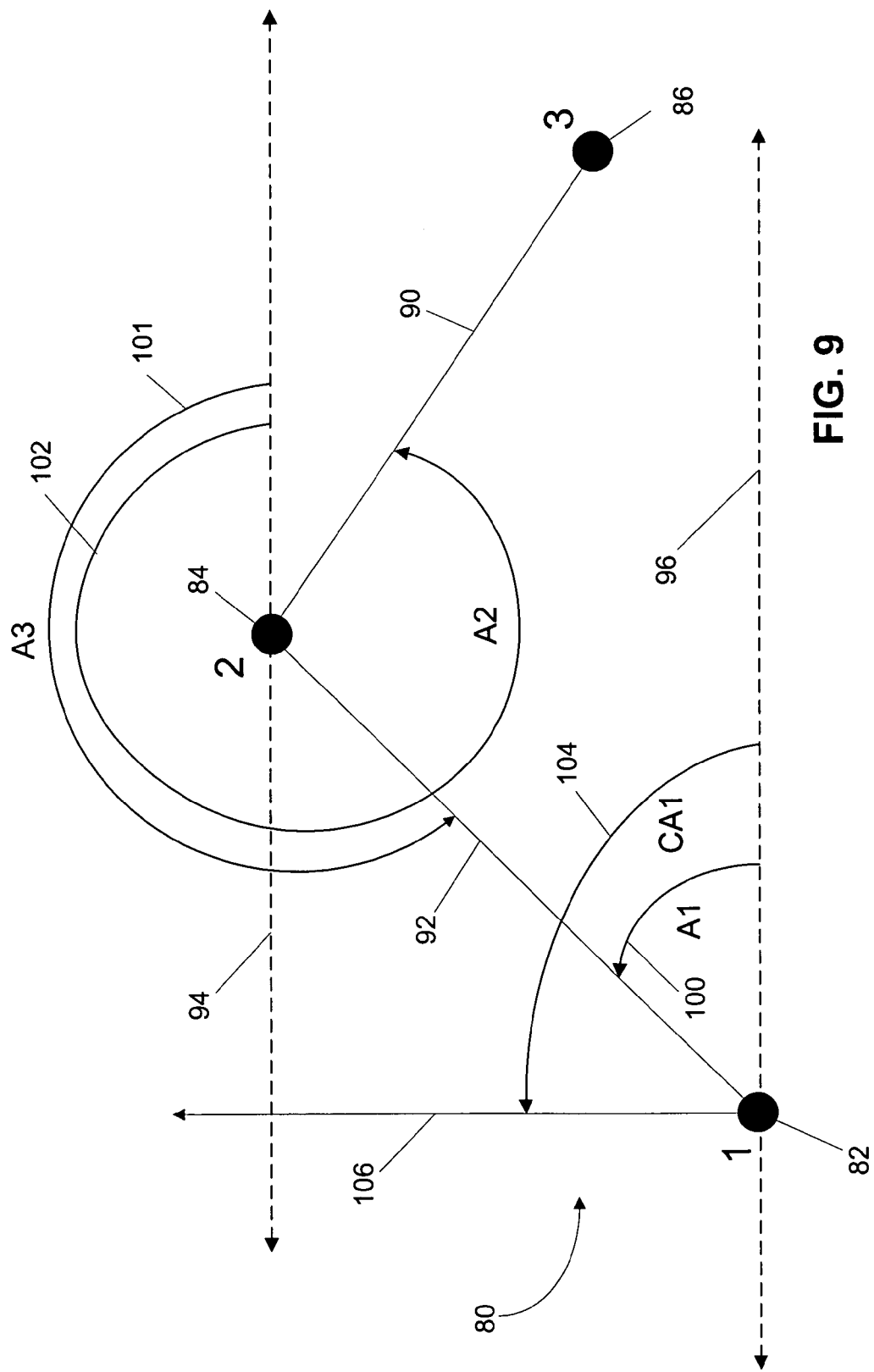

Using the first displacement angle and the average of the second displacement angle and the third displacement angle, the cubic Bézier curve logic 58 derives a first control angle. In some embodiments, the first displacement angle is averaged with the average of the second and third displacement angles. An exemplary first control angle 104 based on the first and second displacement angles 100 and 102 is illustrated in FIG. 9. In some embodiments, if the average of the second and third displacement angles falls between the value of the first displacement angle and the value of the first displacement angle minus 180°, then the value of the first control angle is based on the average value of the second and thirds displacement angles minus 180°. Other formulas may also be used to derive an angle value for the first control angle.

After calculating a first control angle, the cubic Bézier curve logic 58 generates a first control ray extending from the end point ($P_x$) at an angle equal to the first control angle as measured from the horizontal reference line containing the end point ($P_x$). Again, the value of a first control angle may be measured in a counterclockwise direction from a horizontal reference line. The first control ray generated from the first control angle provides a reference line for a control point for the end point ($P_x$). An exemplary first control ray 106 starting at the first end point 82 and extending infinitely at an angle equal to the first control value 104 from the horizontal reference line 96 is also illustrated in FIG. 9.

Figure 10:
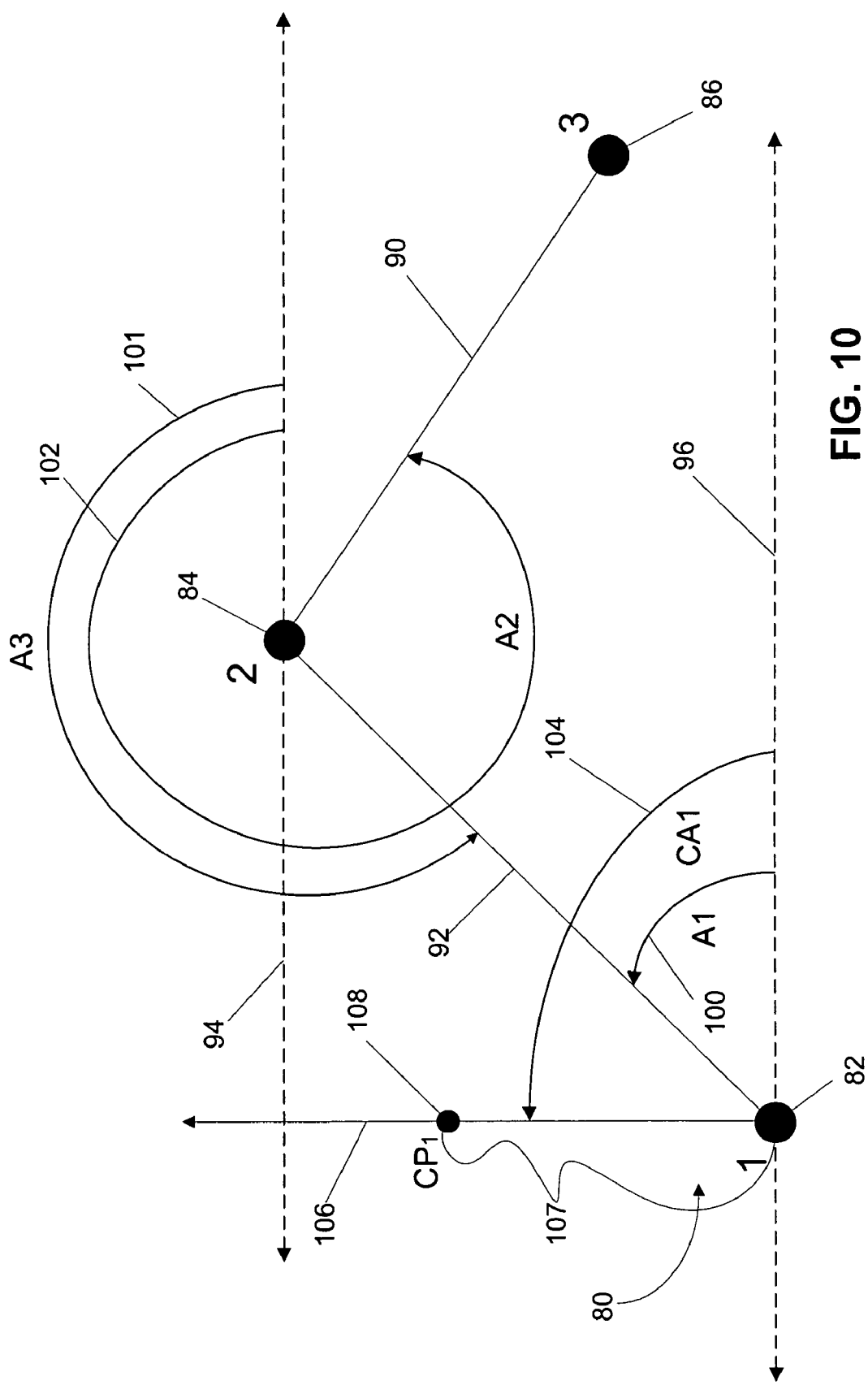

To determine a precise location for a control point along the first control ray, the cubic Bézier curve logic 58 calculates a first derived distance. The first derived distance specifies a distance or length between the end point and a first control point as measured along the first control ray. In some embodiments, when determining a control point for an end point, the derived distance is equal to half the length of the straight line segment containing the end point. The first derived distance may also be set to other values, such as the average of the first and second straight line segments, one-third the length of the first straight line segment, the value of the longer of the first and second straight line segments minus the shorter of the first and second straight line segments, a constant value, or the like. The particular formula for the first derived distance may depend on the characteristics of the graphics rendering application 56 and/or the set of points. As illustrated in FIG. 10, an exemplary first derived distance 107 equal to half the length of the second line segment 92 marks the location of a first control point 108. The first control point 108 is associated with the first end point 82 and will be used for a cubic Bézier curve connecting the first end point 82 and the second non-end point 84. In general, a control point generated or associated with an end point ($P_x$) is used in a cubic Bézier curve connecting the end point ($P_x$) and the next consecutive point to the end point ($P_{x+1}$ or $P_{x-1}$).

Figure 11:
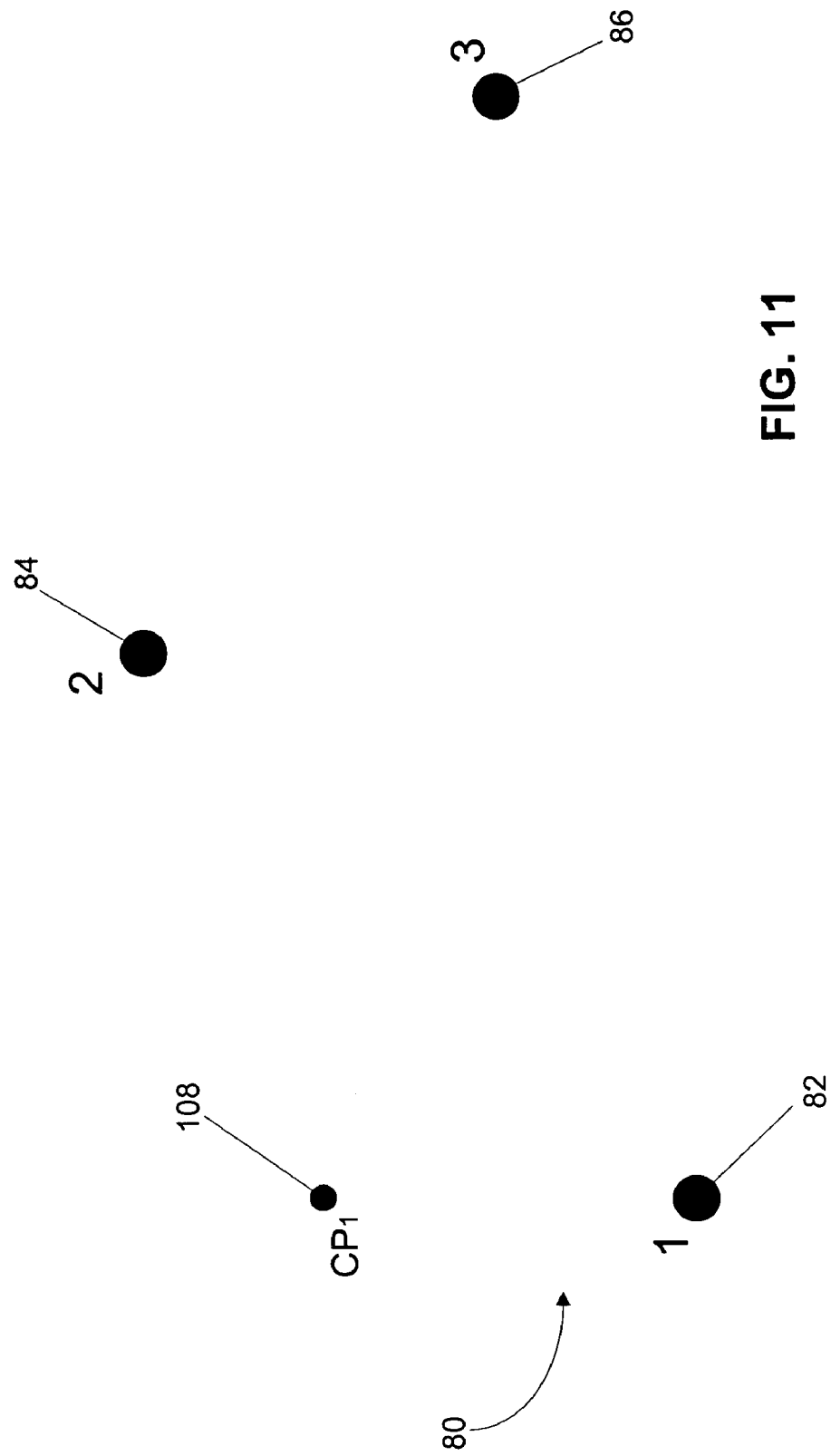

It should be noted that intermediary line segments, reference lines, displacement angles, control rays, control angles, and derived distances are used to generate a control point and may be calculated internally by cubic Bézier curve logic 58. These intermediary calculations and geometric shapes are not, in general, rendered or displayed during the process of generating control points or when the final cubic Bézier curve is displayed. FIG. 11 illustrates the set of points 80 and the first control point 108 after removing the intermediary line segments, reference lines, control ray, and like, which were used to determine the first control point 108.

Figure 12:
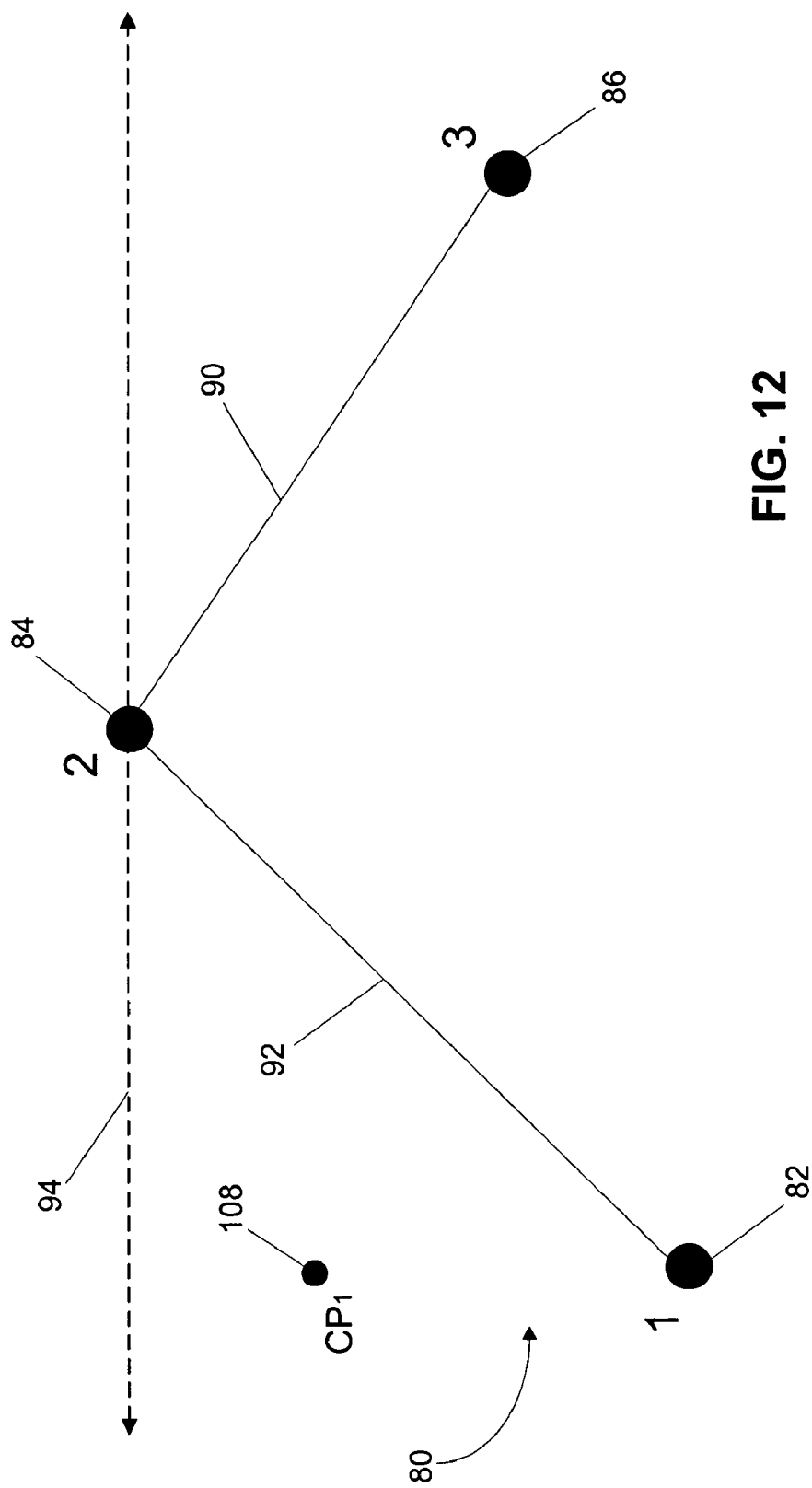

In some embodiments, a similar method as described above is used to determine control points associated with a non-end point. The method for non-end points, however, generates two control points instead of one. As before, to start the method, the cubic Bézier curve logic 58 determines a first straight line segment between the non-end point ($P_y$) and the next consecutive point ($P_{y+1}$) and a second line segment between the non-end point ($P_y$) and the previous consecutive point ($P_{y-1}$). Exemplary line segments 90 and 92 are illustrated in FIG. 12. The cubic Bézier curve logic 58 also determines or uses the horizontal reference line 94 containing the non-end point.

Figure 13:
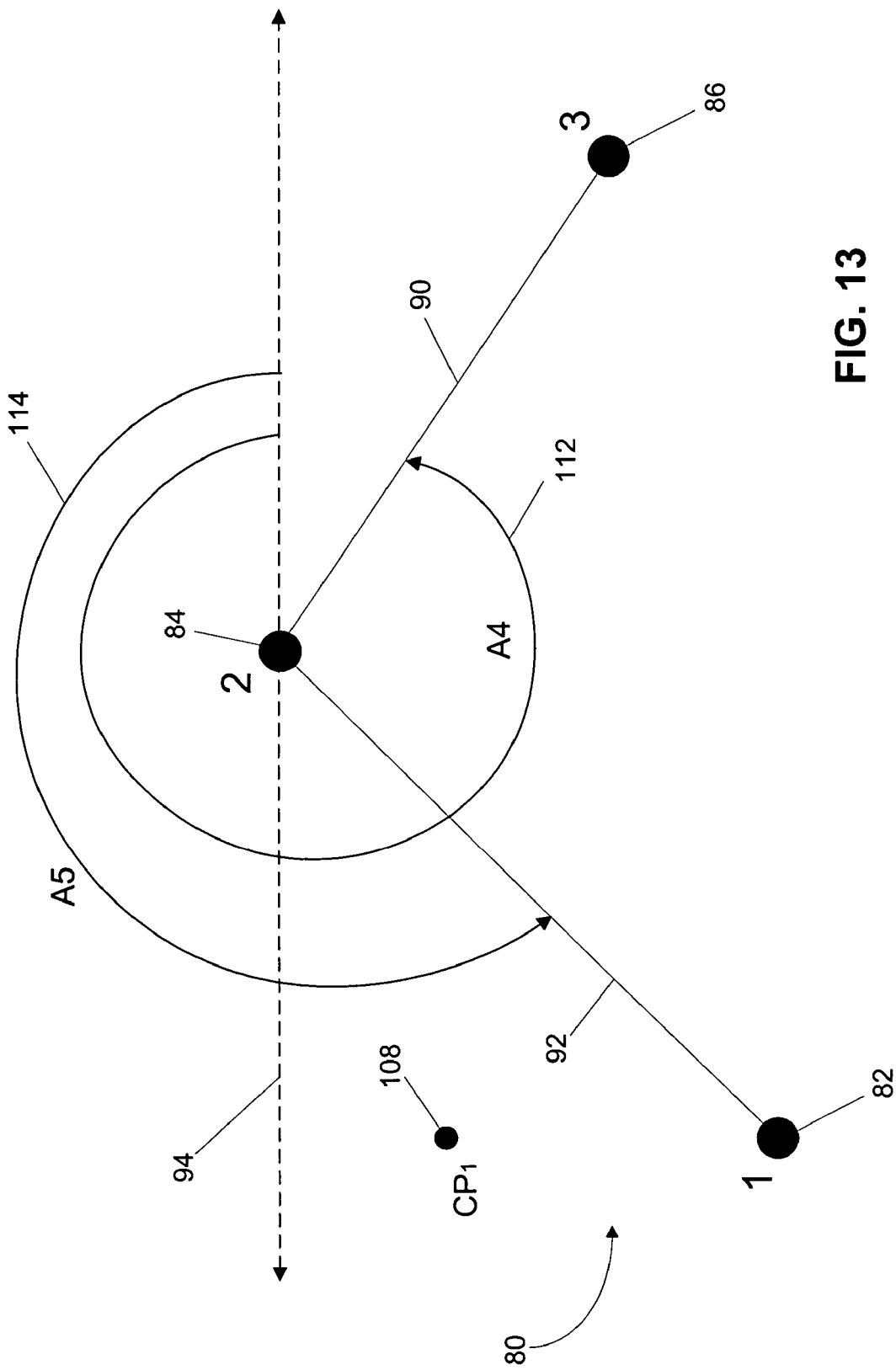

Using the horizontal reference line, which contains the non-end point ($P_y$), the cubic Bézier curve application determines a fourth displacement angle between the horizontal reference line and the first line segment between the non-end point ($P_y$) and the next consecutive point ($P_{y+1}$). The cubic Bézier curve application also determines a fifth displacement angle between the horizontal reference line containing the non-end point ($P_y$) and the second line segment connecting the non-end point ($P_y$) with the previous consecutive point ($P_{y-1}$). As previously stated, the displacement angles may be measured in a counterclockwise direction from the horizontal reference line. As illustrated in FIG. 13, an exemplary fourth displacement angle 112 spans from the first horizontal reference line 94 to the first line segment 90 and an exemplary fifth displacement angle 114 spans from the first horizontal reference line 94 to the second line segment 92.

Figure 14:
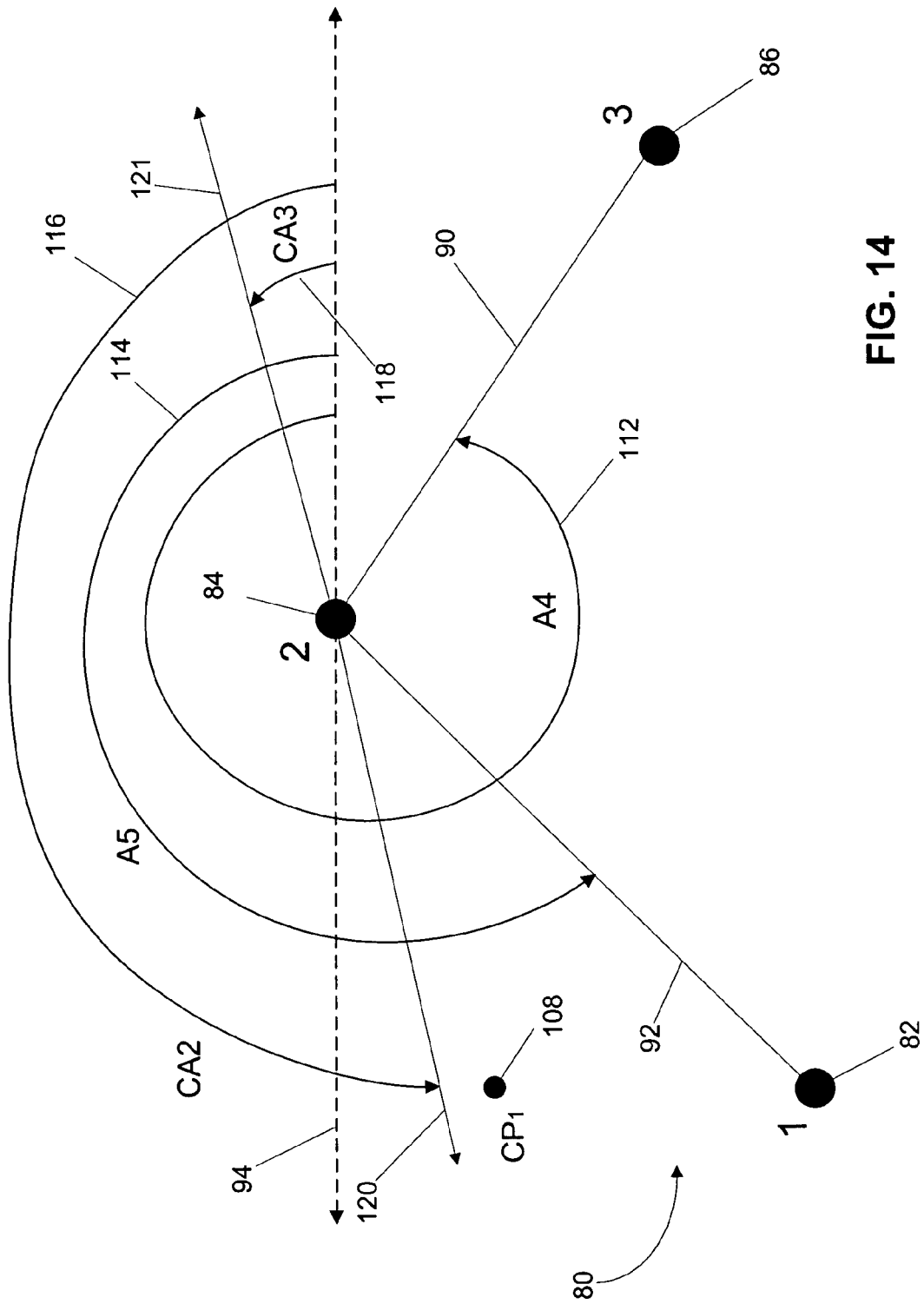

After determining the fourth and fifth displacement angles for the non-end point, the cubic Bézier curve logic 58 calculates a second and third control angle. The values of the second and third control angles may be derived from the values of the fourth and fifth displacement angles. In some embodiments, if the value of the fourth displacement angle is greater than the value of the fifth displacement value, then the value of the second control angle is equal to the average of the values of the fourth and fifth displacement angles plus 90° and the value of the third control angle is equal to the average of the values of the fourth and fifth displacement angles minus 90°. Otherwise, the value of the second control angle is equal to the average of the values of the fourth and fifth displacement angles minus 90° and the value of the third control angle is equal to the average of the fourth and fifth displacement angles plus 90°. Other methods of calculating the second and third control angles may be used, but the second and third control angles must always be 180° apart. Exemplary second and third control angles 116 and 118 are illustrated in FIG. 14.

As described above for the first control angle, using the second and third control angles, the cubic Bézier curve logic 58 generates a second control ray and a third control ray, respectively. In some embodiments, both the second control ray and the third control ray extend infinitely from the non-end point at angles specified by the second and third control angles respectively. As previously described, the second and third control angles may be measured in a counterclockwise direction from the horizontal reference line that contains the non-end point. The second and third control rays each provide an infinite reference line for a control point associated with the non-end point. FIG. 14 also illustrates an exemplary second control ray 120 extending from the second non-end point 84 at an angle equal to the calculated second control angle 116 and an exemplary third control ray 121 extending from the second non-end point 84 at an angle equal to the third control angle 118. Both the second and third control angles are measured from the first horizontal reference line 94.

To determine precise control points for the non-end point (one control point along each of the second and third control rays), the cubic Bézier curve logic 58 may calculate a second and third derived distance. The second derived distance may specify a distance measured along the second control ray between the non-end point and a second control point for the non-end point. The third derived distance may specify a distance measured along the third control ray between the non-end point and a third control point for the non-end point. The second control point associated with the non-end point may be used in a cubic Bézier curve connecting the non-end point with the previous consecutive point, and the third control point associated with the non-end point may be used in a cubic Bézier curve connecting the non-end point with the next consecutive point.

Figure 15:
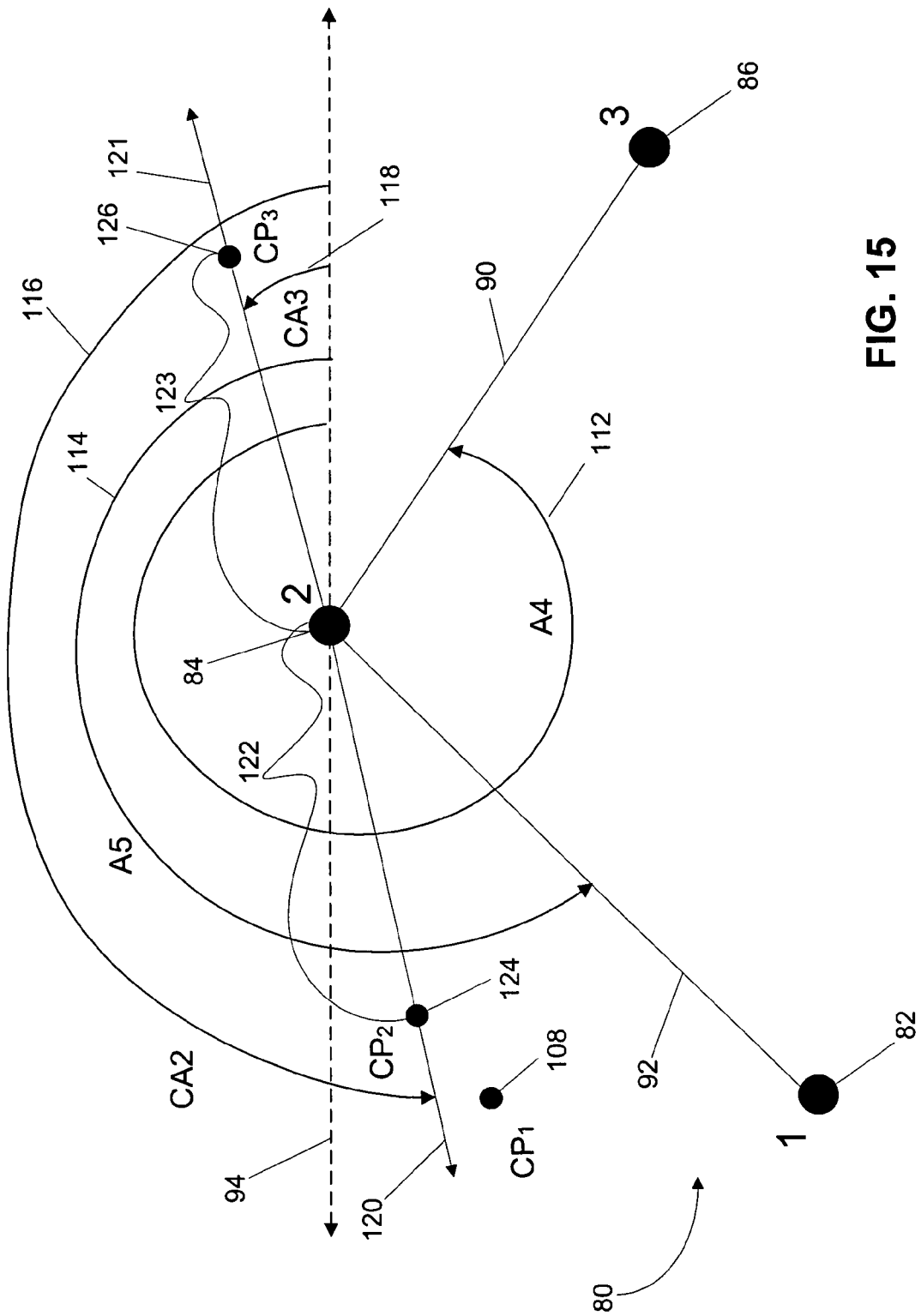

In some embodiments, the second derived distance is equal to the third derived distance, and both the second and third derived distances are equal to half the length of the shorter of the two straight line segments previously determined that contain the non-end point. As previously described, other formulas may be used to calculate derived distances. For the exemplary set of points 80, the lines segments containing the second non-end point 84 are the first line segment 90 and the second line segment 92. Consequently, as illustrated in FIG. 15, the values of a second derived distance 122 and a third derived distance 123 may be set to half the length of the shorter of the first and second line segments 90 and 92. The second and third derived distances 122 and 123 subsequently generate a second control point 124 and a third control point 126.

Figure 16:
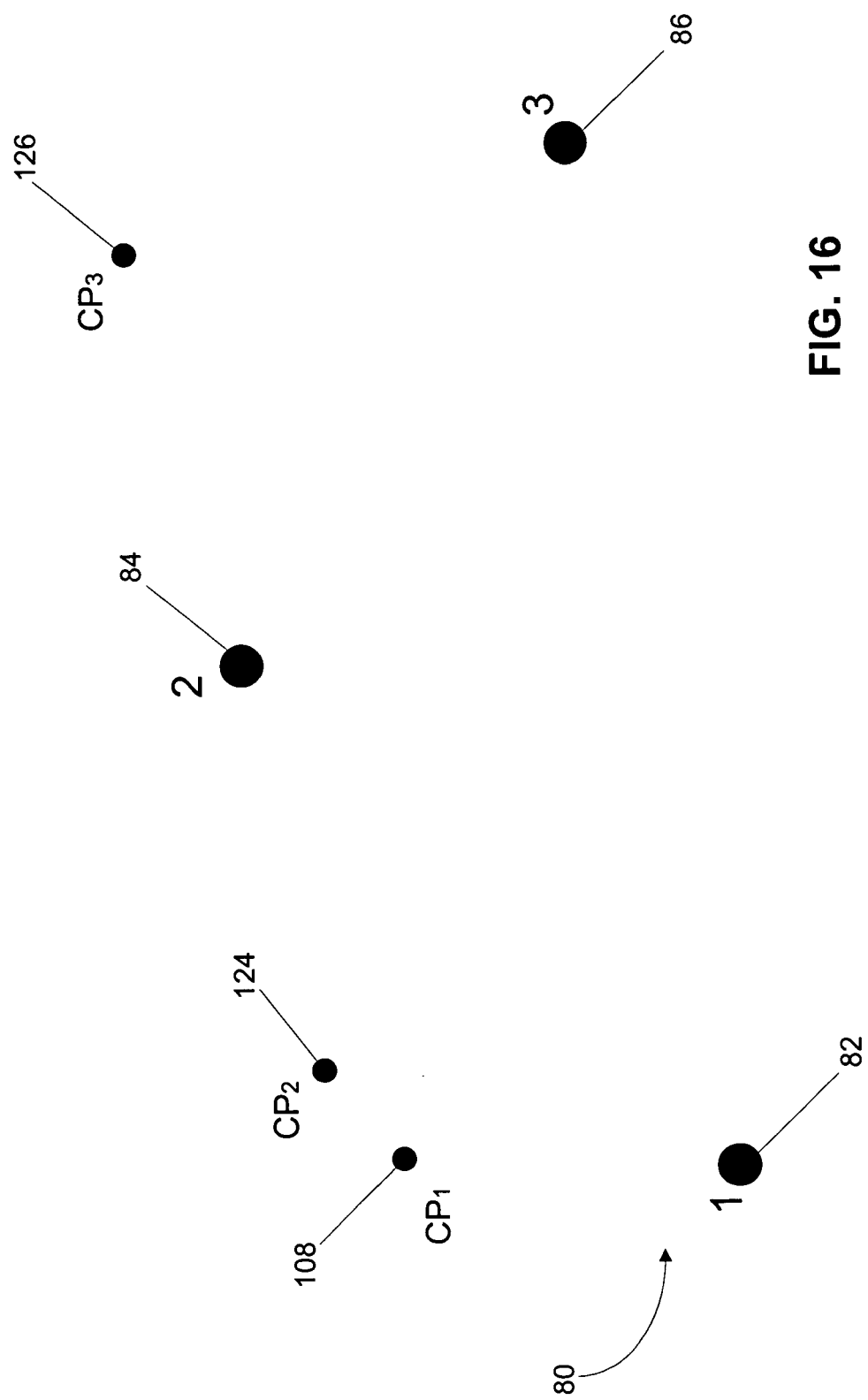

FIG. 16 illustrates the set of points 80, the first control point 108, the second control point 124, and the third control point 126 with the intermediary reference lines, angles, and rays removed.

Figure 17:
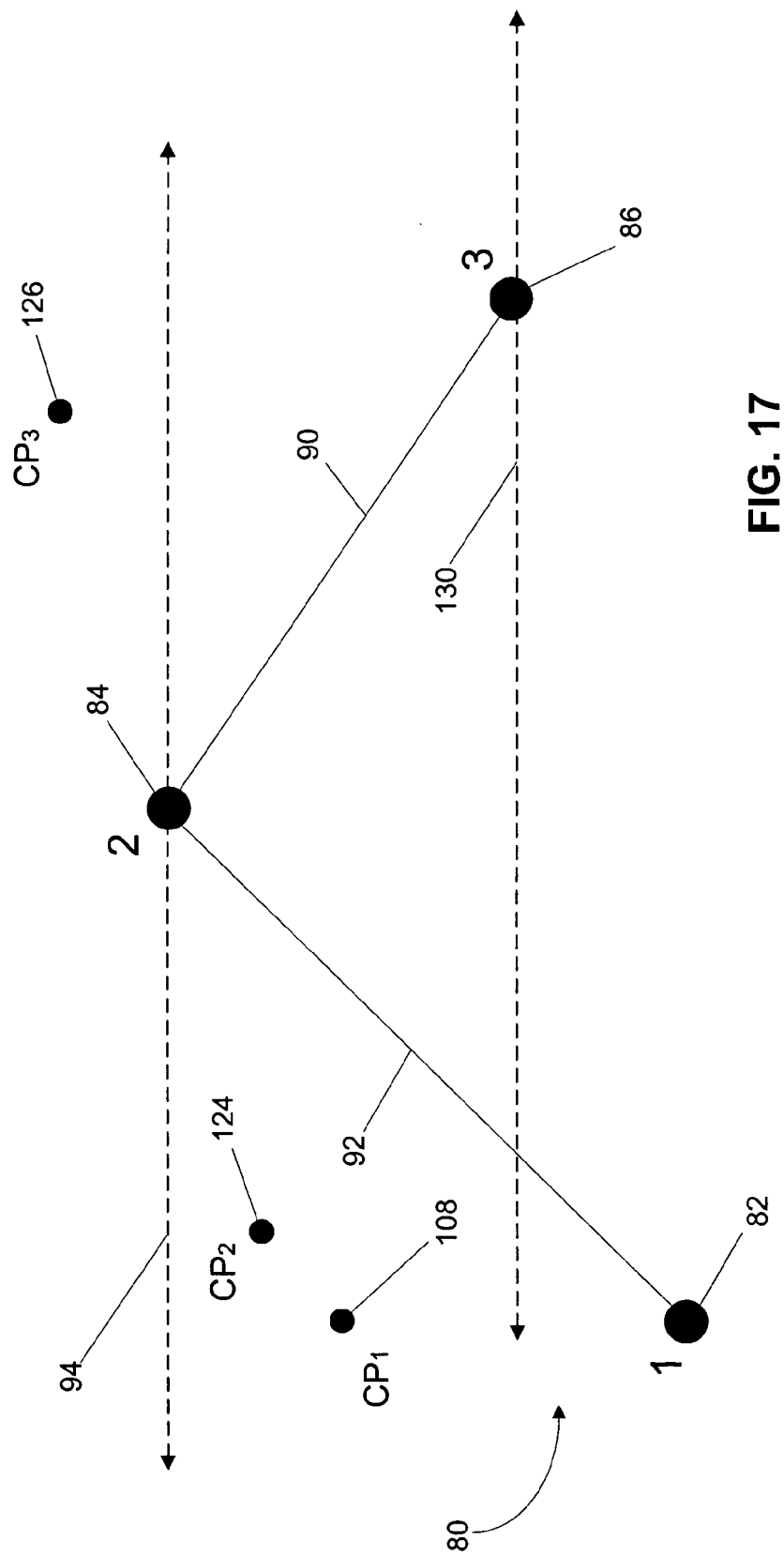

The above method for generating control points for non-end points may be repeated for each non-end point contained within a set of points. In some embodiments, in order to complete a series of cubic Bézier curves connecting a set of points, however, a control point must be generated that is associated with a last point, or a final end point, contained in a set of points. The method previously presented for an end point may be repeated for the last end point. To determine a final control point for the exemplary set of points 80, the cubic Bézier curve logic 58 starts the method, as illustrated in FIG. 17, by determining the first line segment 90 between the second non-end point 84 and the third end point 86 and the second line segment 92 between the second non-end point 84 and the first end point 82. The cubic Bézier curve logic 58 also determines the first horizontal line 94 containing the second non-end point 84 and a third horizontal line 130 containing the third end point 86, as illustrated in FIG. 17.

Figure 18:
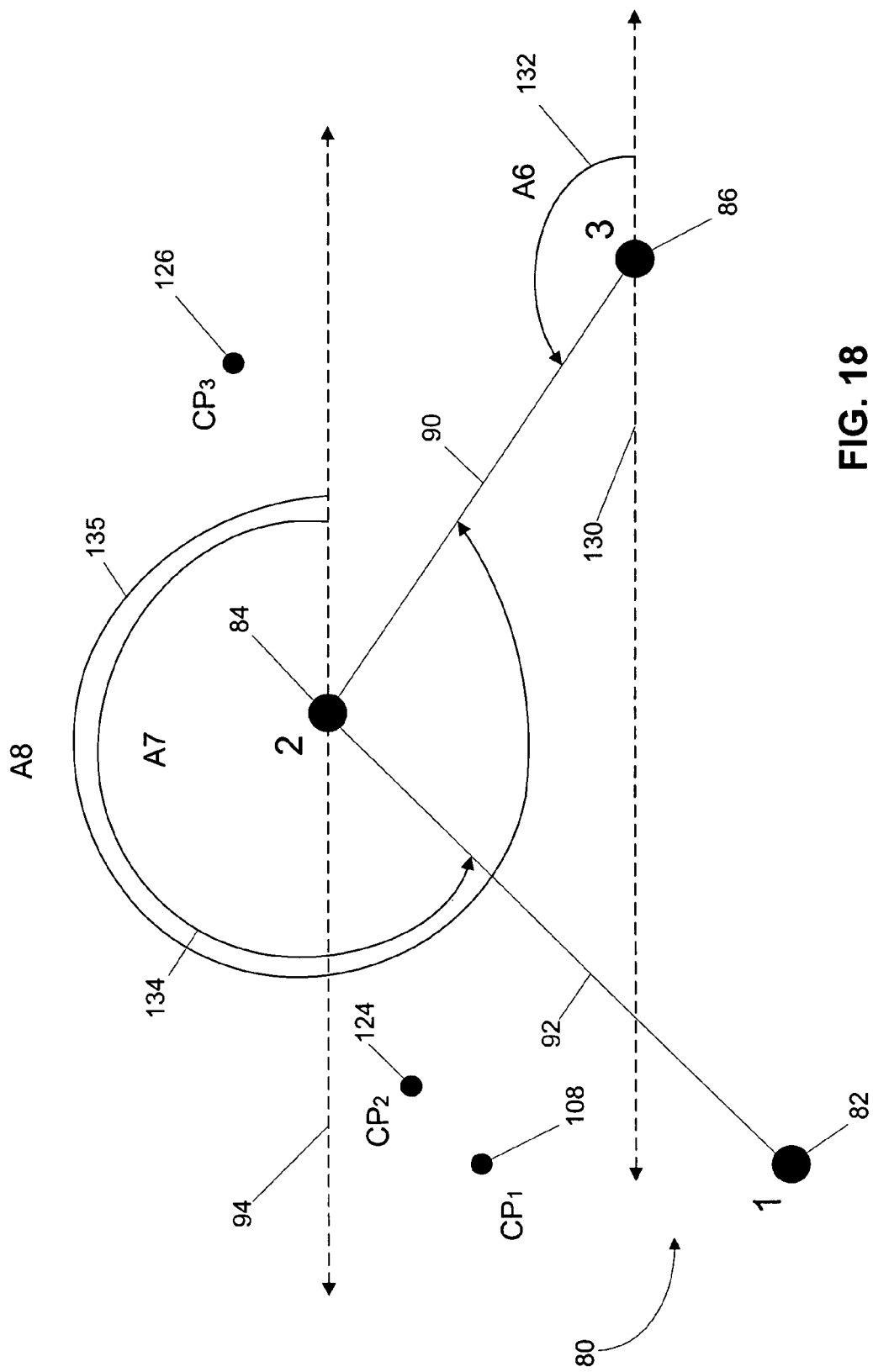

After determining the horizontal reference lines 94 and 130, the cubic Bézier curve logic 58 determines a sixth displacement angle 132 between the third horizontal reference line 130 and the first line segment 90 and a seventh displacement angle 134 between the first horizontal reference line 94 and the second line segment 92 and an eighth displacement angle 135 between the first horizontal reference line 94 and the first line segment 90 (see FIG. 18).

Figure 19:
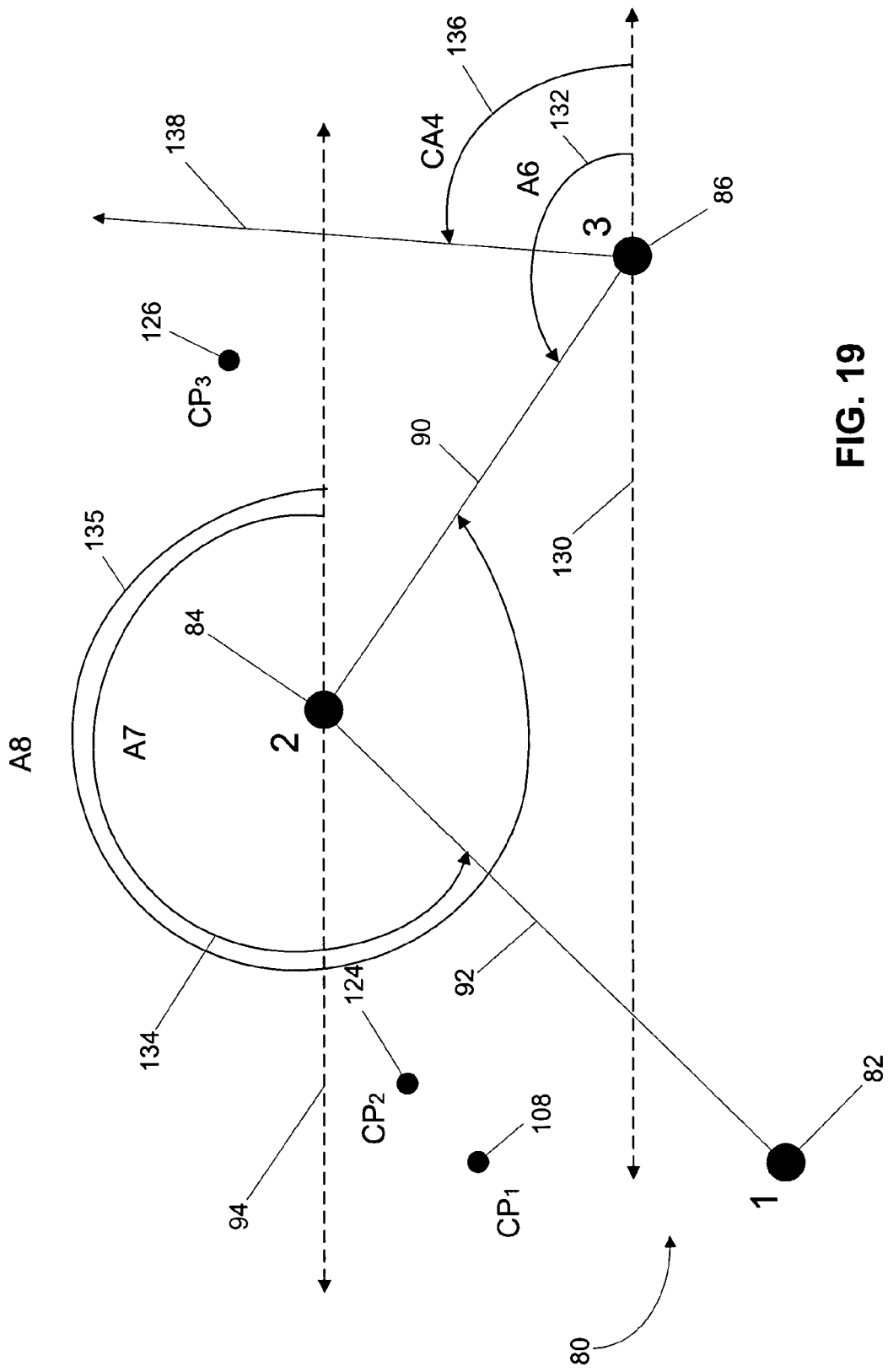

Using the sixth displacement angle 132 and the average of the seventh displacement angle 134 and the eighth displacement angle 135, the cubic Bézier curve logic 58 derives a fourth control angle 136, as illustrated in FIG. 19. In some embodiments, the sixth displacement angle is averaged with the average of the seventh and eighth displacement angles. In some embodiments, if the average of the seventh and eighth displacement angles falls between the value of the sixth displacement angle and the value of the sixth displacement angle minus 180°, then the value of the fourth control angle uses the average value of the seventh and eighth displacement angles minus 180°. As previously indicated, other formulas may also be used to derive an angle value for the fourth control angle 136.

After calculating the fourth control angle 136, the cubic Bézier curve logic 58 generates a fourth control ray 138 extending from the third end point 86 at an angle equal to the value of the fourth control angle 136 as measured from third horizontal reference line 130 (see FIG. 19). Again, the value of the fourth control angle 136 may be measured in a counterclockwise direction from the third horizontal reference line 130. The fourth control ray 138 generated from the fourth control angle 136 provides a reference line for a fourth control point 140 associated with the third end point 86.

Figure 20:
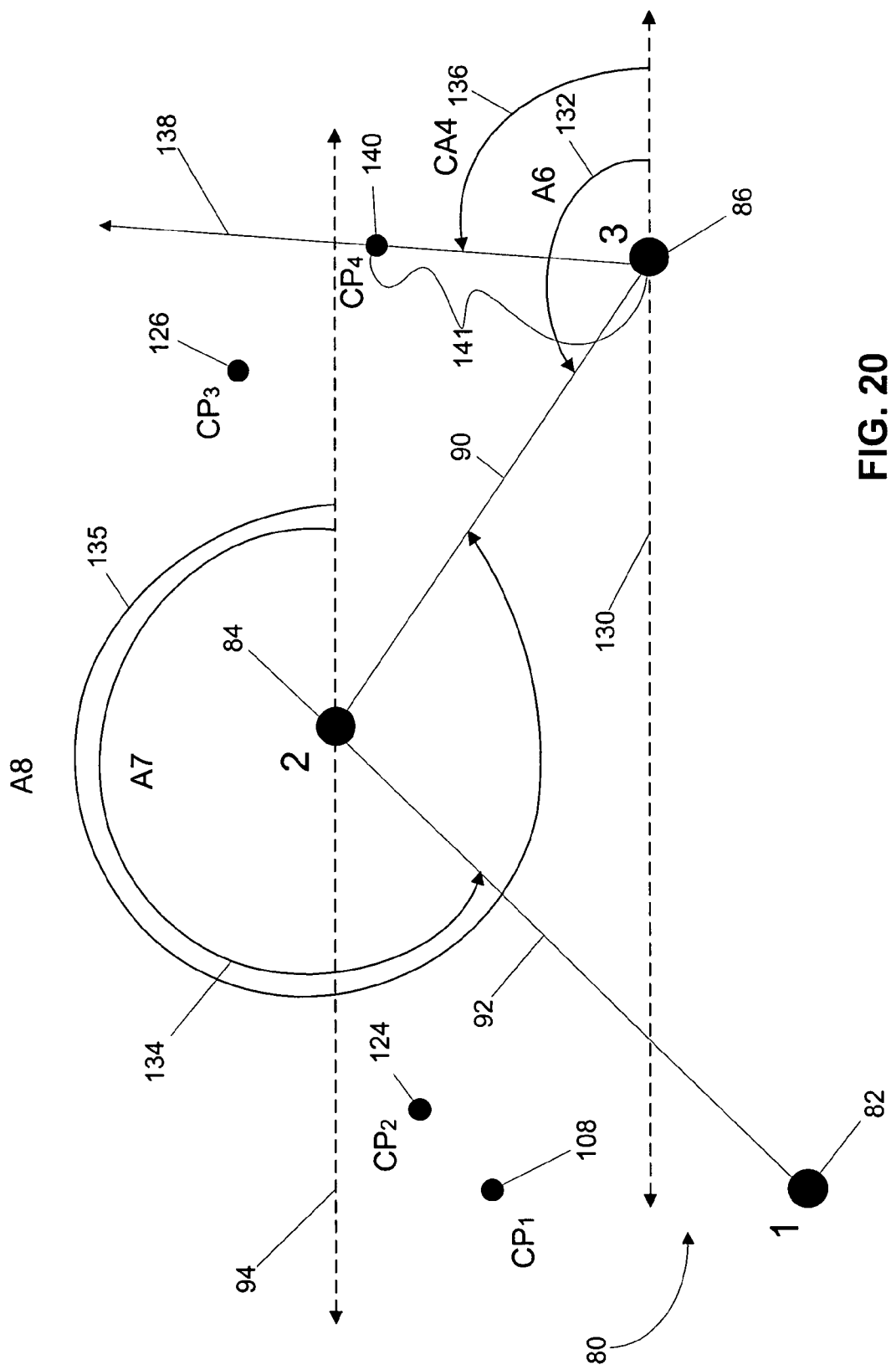

To determine a precise location for the fourth control point 140 along the fourth control ray 138, the cubic Bézier curve logic 58 calculates a fourth derived distance 141. The fourth derived distance 141 specifies a distance or length between the third end point 86 and the fourth control point 140 as measured along the fourth control ray 138. In some embodiments, the fourth derived distance 141 is equal to half the length of the first line segment 90 that contains the third end point 86. The fourth derived distance 141, illustrated in FIG. 20, is equal to half the length of the first line segment 90 and marks the location of the fourth control point 140. The control point 140, associated with the third end point 86, is used in a cubic Bézier curve connecting the third end point 86 and the second non-end point 84.

Figure 21:
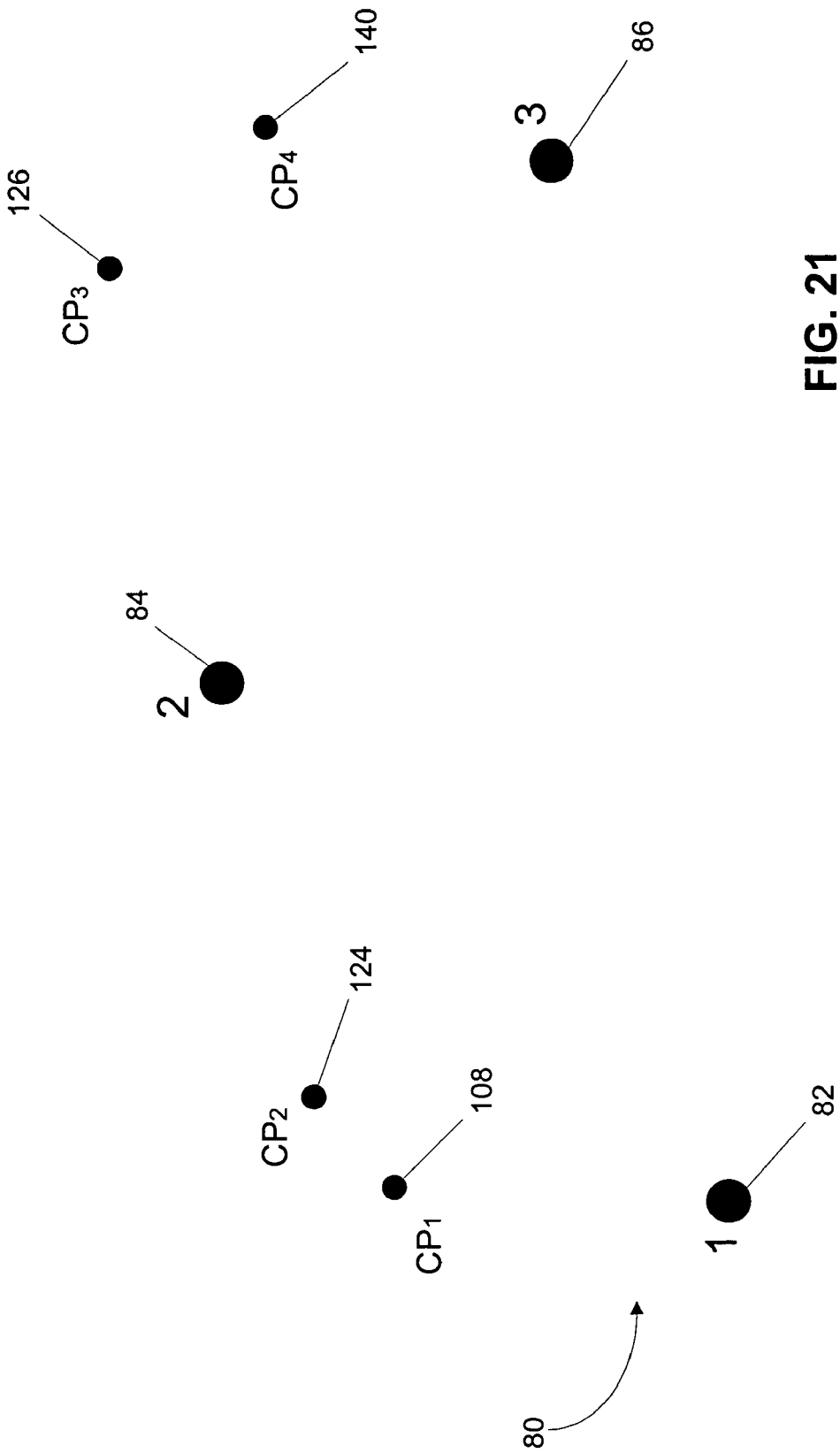
Figure 22:
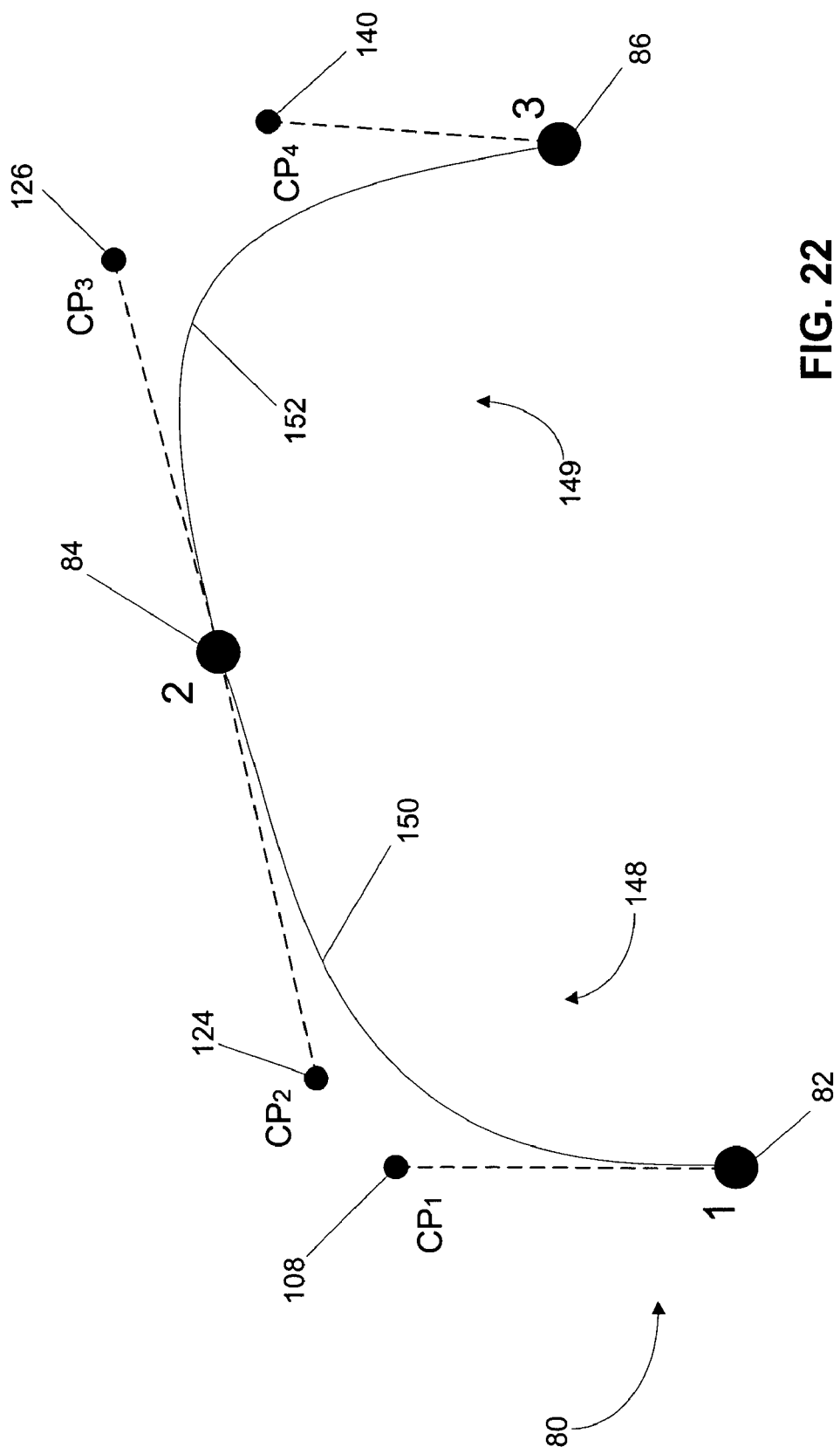
FIG. 22 illustrates a series of cubic Bézier curves connecting the set of points of FIG. 5.

FIG. 21 illustrates the set of points 80, the first control point 108, the second control point 124, the third control point 126, and the fourth control point 140 with the intermediary line segments, reference lines, displacement angles, and the like removed. Using the set of points 80; the generated control points 108, 124, 126, and 140; and a set of cubic Bézier curve equations, the cubic Bézier curve logic 58, graphics rendering application 56, or operating system 52 can generate a series of cubic Bézier curves connecting the first end point 82, the second non-end point 84, and the third end point 86. FIG. 22 illustrates the set of points 80 connected by a cubic Bézier curve 148 and a cubic Bézier curve 149. It should be noted that the control points 108, 124, 126, and 140 and the dashed line connecting each control point to its respective point from the set of points 80, are shown for illustrative purposes and may not be displayed with the cubic Bézier curves 148 and 149. The cubic Bézier curve 148 connects the first end point 82 to the second non-end point 84 by a spline 150. The shape of the spline 150 is influenced by the first control point 108 associated with the first end point 82 and the second control point 124 associated with the second non-end point 84. The cubic Bézier curve 149 connects the second non-end point 84 to the third end point 86 by a spline 152. The shape of the spline 152 is influenced by the third control point 126 associated with the second non-end point 84 and the fourth control point 140 associated with the third end point 86. As illustrated in FIG. 22, the generated control points 108, 124, 126, and 140 are used to create a series of cubic Bézier curves 148 and 149 that smoothly connect the set of points 80.

Various features and advantages of the invention are set forth in the following claims.

The invention claimed is:

1. A method of generating a control point for a cubic Bézier curve between a first point and a second point in a sequence of ordered points using three consecutive points from the sequence of ordered points, the three consecutive points including the first point, the second point, and a third point, based on coordinates of the first point, coordinates of the second point, and coordinates of the third point, the method comprising:

determining a first line segment between the second point and the third point;

determining a second line segment between the first point and the second point;

determining a first horizontal reference line containing the second point;

determining a second horizontal reference line containing the first point;

determining a first angle between the second horizontal reference line and the first line segment;

determining a second angle between the first horizontal reference line and the second line segment;

determining a third angle between the first horizontal reference line and the first line segment;

generating a first control angle based on the first angle and the average of the second and third angles;

generating a control distance based on the first line segment;

generating the control point based on the first control angle and the control distance; and displaying a cubic Bézier curve between the first point and the second point.

2. The method as claimed in claim 1, wherein determining a first angle includes measuring in a counterclockwise direction.

3. The method as claimed in claim 1, wherein determining a second angle includes measuring in a counterclockwise direction.

4. The method as claimed in claim 1, wherein determining a third angle includes measuring in a counterclockwise direction.

5. The method as claimed in claim 1, wherein determining a first control angle includes measuring in a counterclockwise direction.

6. The method as claimed in claim 1, wherein generating a first control angle includes determining if the average of the second and third angle is between the first angle and the first angle minus 180°.

7. The method as claimed in claim 6, wherein generating a first control angle includes setting the first control angle to the first angle averaged with the average of the second and third angles.

8. The method as claimed in 1, wherein generating a control distance includes setting the control distance to half the length of the second line segment.

9. A method of generating a control point for a cubic Bézier curve between a first point and a second point in a sequence of ordered points, the method comprising:
selecting a third point from the sequence of ordered points;
determining a first line segment between the second point and the third point;
determining a second line segment between the first point and the second point;
determining a first horizontal reference line containing the second point;
determining a first angle between the first horizontal reference line and the first line segment;
determining a second angle between the first horizontal reference line and the second line segment;
generating a first control angle based on the first angle and the second angle;
generating a control distance based on the first line segment and the second line segment;
generating the control point based on the first control angle and the control distance; and
displaying a cubic Bézier curve between the first point and the second point.

10. The method as claimed in claim 9, wherein determining a first angle includes measuring in a counterclockwise direction.

11. The method as claimed in claim 9, wherein determining a second angle includes measuring in a counterclockwise direction.

12. The method as claimed in claim 9, wherein generating a first control angle includes adding 90° to the average of the first and second angles to determine a first control angle when the value of the first angle is greater than the value of the second angle.

13. The method as claimed in claim 9, wherein generating a first control angle includes subtracting 90° from the average of the first and second angles to determine a first control angle when the value of the first angle is less than or equal to the value of the second angle.

14. The method as claimed in claim 9, wherein generating a control distance includes setting the control distance to half the length of the first line segment when the first line segment is smaller than the second line segment.

15. The method as claimed in claim 9, wherein generating a control distance includes setting the control distance to half the length of the second line segment when the second line segment is smaller than the first line segment.

16. The method as claimed in claim 9, wherein generating a first control angle includes measuring in a counterclockwise direction.

17. A method of generating a first control point for a cubic Bézier curve between a first point and a second point in a sequence of ordered points, the method comprising:
selecting a third point from the sequence of ordered points;
determining a first line segment between the second point and the third point;
determining a second line segment between the first point and the second point;
determining a horizontal reference line containing the second point;
determining a first angle between the horizontal reference line and the first line segment;
determining a second angle between the horizontal reference line and the second line segment;
generating a first control angle based on the first angle and the second angle;
generating a first control distance based on the first line segment and the second line segment;
generating the first control point based on the first control angle and the control distance; and
displaying a cubic Bézier curve between the first point and the second point.

18. The method as claimed in claim 17, wherein determining a first angle includes measuring in a counterclockwise direction.

19. The method as claimed in claim 17, wherein determining a second angle includes measuring in a counterclockwise direction.

20. The method as claimed in claim 17, wherein generating a first control angle includes averaging the first angle and the second angle to determine a fourth angle.

21. The method as claimed in claim 20, wherein generating a first control angle includes determining if the first angle is greater than the second angle.

22. The method as claimed in claim 21, wherein generating a first control angle includes adding 90° to the average of the first and second angles to determine a first control angle when the value of the first angle is less than or equal to the value of the second angle.

23. The method as claimed in claim 21, wherein generating a first control angle includes subtracting 90° to the average of the first and second angles to determine a first control angle when the value of the first angle is greater than the value of the second angle.

24. The method as claimed in claim 17, wherein generating a first control distance includes determining a first length of the first line segment and a second length of the second line segment.

25. The method as claimed in claim 24, wherein generating a first control distance includes setting the first control distance to half the first length if the first length is less than or equal to the second length.

26. The method as claimed in claim 24, wherein generating a first control distance includes setting the first control distance to half the second length if the second length is less than or equal to the first length.

27. A method of generating a cubic Bézier curve between a first point and a second point from a sequence of ordered points, the method comprising:
selecting a third point from the sequence of ordered points;
determining a first control point based on the first point, the second point, and the third point by determining a first line segment between the second point and the third point, determining a second line segment between the first point and the second point, determining a first horizontal reference line containing the second point, determining a first angle between the first horizontal reference line and the first line segment, determining a second angle between the first horizontal reference line and the second line segment, generating a first control angle based on the first angle and the second angle, generating a first control distance based on the first line segment and the second line segment, and determining the first control point based on the first control angle and the first control distance;

selecting a fourth point from the sequence of ordered points;

determining a second control point based on the first point, the second point, and the fourth point;

generating a cubic Bézier curve between the first point and the second point using the first control point and the second control point; and displaying the cubic Bézier curve.

28. The method as claimed in claim 27, wherein the first point and the second point are consecutive points in the sequence of ordered points.

29. The method as claimed in claim 28, wherein the third point is the next consecutive point from the second point in the sequence of ordered points.

30. The method as claimed in claim 28, wherein the fourth point is the previous consecutive point from the first point in the sequence of ordered points.

31. A method of generating a cubic Bézier curve for a sequence of ordered points, the method comprising:
    selecting a first set of three consecutive points from the sequence of points, the first set containing a first point, a middle point, and a third point;
    determining a first line segment between the first point and the middle point;
    determining a second line segment between the middle point and the third point;
    determining a first horizontal reference line containing the middle point;
    determining a first angle between the first horizontal reference line and the first line segment;
    determining a second angle between the first horizontal reference line and the second line segment;
    generating a first control angle from the first angle and the second angle;
    generating a first control distance from the first line segment and the second line segment;
    generating a first control point based on the first control angle and the first control distance;
    selecting a second set of three consecutive points from the sequence of points, the second set containing the first point, the middle point, and a fourth point;
    determining a third line segment between the fourth point and the first point;
    determining a fourth line segment between the first point and the middle point;
    determining a second horizontal reference line containing the first point;
    determining a fourth angle between the second horizontal reference line and the third line segment;
    determining a fifth angle between the second horizontal reference line and the fourth line segment;
    generating a second control angle from the fourth angle and the fifth angle;
    generating a second control distance from the fourth line segment and the fifth line segment;
    generating a second control point based on the second control angle and the second control distance;
    generating a cubic Bézier curve between the first point and the middle point using the first control point and the second control point; and
    displaying the cubic Bézier curve.

32. The method as claimed in claim 31, wherein determining a first angle includes measuring in a counterclockwise direction.

33. The method as claimed in claim 31, wherein determining a second angle includes measuring in a counterclockwise direction.

34. The method as claimed in claim 31, wherein generating a first control angle includes averaging the first angle and the second angles.

35. The method as claimed in claim 34, wherein generating a first control angle includes determining if the first angle is greater than the second angle.

36. The method as claimed in claim 35, wherein generating a first control angle includes setting the first control angle to the average of the first and second angles plus 90° if the first angle is greater than the second angle.

37. The method as claimed in claim 35, wherein generating a first control angle includes setting the first control angle to the average of the first and second angles minus 90° if the first angle is not greater than the second angle.

38. The method as claimed in claim 31, wherein generating a first control distance includes determining a first length of the first line segment and a second length of the second line segment.

39. The method as claimed in claim 38, wherein generating a first control distance includes setting the first control distance to half the first length if the first length is less than or equal to the second length.

40. The method as claimed in claim 38, wherein generating a first control distance includes setting the first control distance to half the second length if the first length is not less than the second length.

41. The method as claimed in claim 31, wherein determining a fourth angle includes measuring in a counterclockwise direction.

42. The method as claimed in claim 31, wherein determining a fifth angle includes measuring in a counterclockwise direction.

43. The method as claimed in claim 31, wherein generating a second control angle includes averaging the fourth angle and the fifth angle.

44. The method as claimed in claim 43, wherein generating a second control angle includes determining if the fourth angle is greater than the fifth angle.

45. The method as claimed in claim 44, wherein generating a second control angle includes setting the second control angle to the average of the fourth and fifth angles minus 90° if the fourth angle is greater than the fifth angle.

46. The method as claimed in claim 44, wherein generating a second control angle includes setting the second control angle to the average of the fourth and fifth angles plus 90° if the fourth angle is not greater than the fifth angle.

47. The method as claimed in claim 31, wherein generating a second control distance includes determining a third length of the third line segment and a fourth length of the fourth line segment.

48. The method as claimed in claim 47, wherein generating a second control distance includes setting the second control distance to half the third length if the third length is less than the fourth length.

49. The method as claimed in claim 47, wherein generating a second control distance includes setting the second control distance to half the fourth length if the fourth length is less than or equal to the third length.

50. Computer readable medium containing instructions for:
   selecting a first set of three consecutive points from an ordered sequence of points, the first set including a first point, a middle point, and a third point;
   determining a first control point based on the first set;
   selecting a second set of three consecutive points from an ordered sequence of points, the second set including at least two points of the first set and a fourth point;
   determining a second control point based on the second set;
   determining a first line segment between the second point and the third point;
   determining a second line segment between the first point and the second point;
   determining a horizontal reference line containing the second point;
   determining a first angle between the horizontal reference line and the first line segment;
   determining a second angle between the horizontal reference line and the second line segment;
   generating a first control angle based on the first angle and the second angle;
   generating a first control distance based on the first line segment and the second line segment;
   determining the first control point based on the first control angle and the first control distance; and
   displaying a cubic Bézier curve between the first point and the second point.

51. The computer-readable medium as claimed in claim 50, wherein the first point and the second point are consecutive points in the sequence of ordered points.

52. The computer-readable medium as claimed in claim 51, wherein the third point is the next consecutive point from the second point in the sequence of ordered points.

53. The computer-readable medium as claimed in claim 51, wherein the fourth point is the previous consecutive point from the first point in the sequence of ordered points.

54. The computer-readable medium as claimed in claim 53, further comprising instructions for generating a cubic Bézier curve between at least two of the points from the first set of points using the first control point and the second control point.

55. An operating system configured to select a first set of three consecutive points from an ordered sequence of points, the first set including a first point, a middle point, and a third point; to determine a first control point based on the first set; to select a second set of three consecutive points from an ordered sequence of points, the second set including at least two points of the first set and a fourth point; to determine a second control point based on the second set; to determine a first line segment between the second point and the third point; to determine a second line segment between the first point and the second point; to determine a horizontal reference line containing the second point; to determine a first angle between the horizontal reference line and the first line segment; to determine a second angle between the horizontal reference line and the second line segment; to generate a first control angle based on the first angle and the second angle; to generate a first control distance based on the first line segment and the second line segment; to determine the first control point based on the first control angle and the first control distance; and to display a cubic Bezier curve between the first point and the second point.

56. The operating system as claimed in claim 55, further configured to generate a cubic Bézier curve between the first point and the second point using the first control point and the second control point.

57. The operating system as claimed in claim 55, wherein the first point and the second point are consecutive points in the sequence of ordered points.

58. The operating system as claimed in claim 57, wherein the third point is the next consecutive point from the second point in the sequence of ordered points.

59. The operating system as claimed in claim 57, wherein the fourth point is the previous consecutive point from the first point in the sequence of ordered points.

60. A method of generating a cubic Bézier curve between a first point and a second point from a sequence of ordered points, the method comprising:
   selecting a third point from the sequence of ordered points;
   determining a first control point based on the first point, the second point, and the third point;
   selecting a fourth point from the sequence of ordered points;
   determining a second control point based on the first point, the second point, and the fourth point by determining a third line segment between the first point and the second point, determining a fourth line segment between the fourth point and the first point, determining a second horizontal reference line containing the first point, determining a fourth angle between the second horizontal reference line and the third line segment, determining a fifth angle between the second horizontal reference line and the fourth line segment, generating a second control angle based on the fourth angle and the fifth angle, generating a second control distance based on the third line segment and the fourth line segment, and determining the second control point based on the second control angle and the second control distance;
   generating a cubic Bézier curve between the first point and the second point using the first control point and the second control point; and
   displaying the cubic Bézier curve.

61. The method as claimed in claim 60, wherein the first point and the second point are consecutive points in the sequence of ordered points.

62. The method as claimed in claim 61, wherein the third point is the next consecutive point from the second point in the sequence of ordered points.

63. The method as claimed in claim 61, wherein the fourth point is the previous consecutive point from the first point in the sequence of ordered points.

64. Computer readable medium containing instructions for:
   selecting a first set of three consecutive points from an ordered sequence of points, the first set including a first point, a middle point, and a third point;
   determining a first control point based on the first set;
   selecting a second set of three consecutive points from an ordered sequence of points, the second set including at least two points of the first set and a fourth point;
   determining a second control point based on the second set;
   determining a third line segment between the first point and the second point;
   determining a fourth line segment between the fourth point and the first point;

determining a horizontal reference line containing the first point;

determining a fourth angle between the horizontal reference line and the third line segment;

determining a fifth angle between the horizontal reference line and the fourth line segment;

generating a second control angle based on the fourth angle and the fifth angle;

generating a second control distance based on the third line segment and the fourth line segment;

determining the second control point based on the second control angle and the second control distance; and displaying a cubic Bezier curve between the first point and the second point.

65. The computer-readable medium as claimed in claim 64, wherein the first point and the second point are consecutive points in the sequence of ordered points.

66. The computer-readable medium as claimed in claim 65, wherein the third point is the next consecutive point from the second point in the sequence of ordered points.

67. The computer-readable medium as claimed in claim 65, wherein the fourth point is the previous consecutive point from the first point in the sequence of ordered points.

68. The computer-readable medium as claimed in claim 64, further comprising instructions for generating a cubic Bézier curve between at least two of the points from the first set of points using the first control point and the second control point.

69. An operating system configured to select a first set of three consecutive points from an ordered sequence of points, the first set including a first point, a middle point, and a third point; to determine a first control point based on the first set; to select a second set of three consecutive points from an ordered sequence of points, the second set including at least two points of the first set and a forth point; to determine a second control point based on the second set; to determine a third line segment between the first point and the second point; to determine a fourth line segment between the fourth point and the first point; to determine a horizontal reference line containing the first point; to determine a fourth angle between the horizontal reference line and the third line segment; to determine a fifth angle between the horizontal reference line and the fourth line segment; to generate a second control angle based on the fourth angle and the fifth angle; to generate a second control distance based on the third line segment and the fourth line segment; to determine the second control point based on the second control angle and the second control distance; and to display a cubic Bezier curve between the first point and the second point.

70. The operating system as claimed in claim 69, further configured to generate a cubic Bézier curve between the first point and the second point using the first control point and the second control point.

71. The operating system as claimed in claim 69, wherein the first point and the second point are consecutive points in the sequence of ordered points.

72. The operating system as claimed in claim 71, wherein the third point is the next consecutive point from the second point in the sequence of ordered points.

73. The operating system as claimed in claim 71, wherein the fourth point is the previous consecutive point from the first point in the sequence of ordered points.

* * * * *